(12) United States Patent
Okumura et al.

(10) Patent No.: US 11,052,547 B2
(45) Date of Patent: Jul. 6, 2021

(54) ROBOT AND HOUSING

(71) Applicant: Sony Interactive Entertainment Inc., Tokyo (JP)

(72) Inventors: Yasushi Okumura, Tokyo (JP); Katsuhisa Tadano, Tokyo (JP); Yusuke Takahashi, Kanagawa (JP); Shigeyuki Kazama, Tokyo (JP); Tsubasa Umeki, Saitama (JP); Nozomu Uchida, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 353 days.

(21) Appl. No.: 16/092,615

(22) PCT Filed: Feb. 28, 2017

(86) PCT No.: PCT/JP2017/007952
§ 371 (c)(1),
(2) Date: Oct. 10, 2018

(87) PCT Pub. No.: WO2017/183319
PCT Pub. Date: Oct. 26, 2017

(65) Prior Publication Data
US 2019/0118386 A1 Apr. 25, 2019

(30) Foreign Application Priority Data

Apr. 20, 2016 (JP) .............................. JP2016-084824
Aug. 8, 2016 (JP) .............................. JP2016-155889

(51) Int. Cl.
*B25J 9/12* (2006.01)
*B25J 13/08* (2006.01)
(Continued)

(52) U.S. Cl.
CPC ............. *B25J 13/088* (2013.01); *B25J 9/126* (2013.01); *B25J 9/1689* (2013.01);
(Continued)

(58) Field of Classification Search
CPC .. B25J 13/08; B25J 9/12; G02B 27/01; H04R 1/04
See application file for complete search history.

(56) References Cited

U.S. PATENT DOCUMENTS 1,358,159 A 11/1920 Kern
3,638,502 A 2/1972 Leavitt
(Continued)

FOREIGN PATENT DOCUMENTS

JP 62037732 A 2/1987
JP 03254778 A 11/1991
(Continued)

OTHER PUBLICATIONS

Chitra Sethi "Telepresence Robots Take Over"; 6 pages (Year: 2013).*
(Continued)

*Primary Examiner* — Kira Nguyen
(74) *Attorney, Agent, or Firm* — Matthew B. Dernier, Esq.

(57) ABSTRACT

Convenience and usefulness of a tele-existence system are enhanced taking notice of the possibility by collaboration of tele-existence and a head-mounted display apparatus. A movable member is supported for pivotal motion on a housing. In the housing, a driving motor and a transmission member for transmitting rotation of the driving motor to the movable member are provided. A state information acquisition unit acquires facial expression information and/or emotion information of a user who wears a head-mounted display apparatus. A driving controlling unit controls rota- (Continued)

tion of the driving motor on the basis of the facial expression information and/or the emotion information.

11 Claims, 22 Drawing Sheets

(51) Int. Cl.

| | | |
|---|---|---|
| G02B 27/01 | (2006.01) | |
| B25J 9/16 | (2006.01) | |
| B25J 11/00 | (2006.01) | |
| B25J 13/00 | (2006.01) | |
| G05B 19/414 | (2006.01) | |
| G06K 9/00 | (2006.01) | |
| H04R 1/02 | (2006.01) | |
| H04R 1/04 | (2006.01) | |

(52) U.S. Cl.
CPC .......... *B25J 11/0005* (2013.01); *B25J 13/00* (2013.01); *G02B 27/017* (2013.01); *G05B 19/414* (2013.01); *G06K 9/00281* (2013.01); *H04R 1/025* (2013.01); *H04R 1/04* (2013.01); *G02B 27/01* (2013.01); *G02B 2027/0183* (2013.01); *G02B 2027/0187* (2013.01)

(56) References Cited

U.S. PATENT DOCUMENTS

| | | | |
|---|---|---|---|
| 4,068,538 A | 1/1978 | Butler | |
| 4,194,437 A | 3/1980 | Rosheim | |
| 4,621,782 A | 11/1986 | Carlson | |
| 4,628,765 A | 12/1986 | Oien | |
| 5,243,873 A | 9/1993 | Demers | |
| 5,664,752 A | 9/1997 | Matthiessen | |
| 6,026,703 A | 2/2000 | Stanisic | |
| 6,289,263 B1* | 9/2001 | Mukherjee | A63H 33/005 700/245 |
| 6,484,987 B2 | 11/2002 | Weaver | |
| 6,914,622 B1* | 7/2005 | Smith | A47B 21/0073 348/14.05 |
| 7,331,551 B2 | 2/2008 | Oddsen, Jr. | |
| 7,534,057 B2 | 5/2009 | Jones | |
| 8,059,150 B2* | 11/2011 | Gal | G08B 13/19628 348/37 |
| 8,245,993 B2 | 8/2012 | Arnold | |
| 8,544,807 B2 | 10/2013 | Foreman | |
| 8,849,680 B2* | 9/2014 | Wright | G16H 40/67 705/2 |
| 9,235,263 B2 | 1/2016 | Suzuki | |
| 9,272,339 B2 | 3/2016 | Park | |
| 10,197,215 B2 | 2/2019 | Benvenisti | |
| 10,271,045 B2 | 4/2019 | Hong | |
| D866,647 S | 11/2019 | Kim | |
| 2003/0151658 A1* | 8/2003 | Smith | H04N 7/144 348/14.01 |
| 2004/0011938 A1 | 1/2004 | Oddsen, Jr. | |
| 2005/0007445 A1* | 1/2005 | Foote | H04N 7/142 348/14.08 |
| 2005/0110867 A1* | 5/2005 | Schulz | H04N 7/15 348/14.05 |
| 2007/0090237 A1 | 4/2007 | Hsu | |
| 2010/0259471 A1* | 10/2010 | Takano | G06F 3/012 345/156 |
| 2012/0182392 A1* | 7/2012 | Kearns | B25J 19/023 348/46 |
| 2012/0197439 A1* | 8/2012 | Wang | G05D 1/0038 700/259 |
| 2013/0066468 A1* | 3/2013 | Choi | B25J 11/008 700/258 |
| 2014/0094310 A1 | 4/2014 | Bleich | |
| 2015/0061824 A1 | 3/2015 | Suzuki | |
| 2015/0293362 A1* | 10/2015 | Takahashi | H04N 13/296 348/47 |
| 2016/0063766 A1* | 3/2016 | Han | G06F 3/012 345/633 |
| 2016/0282619 A1 | 9/2016 | Oto | |

FOREIGN PATENT DOCUMENTS

| | | | |
|---|---|---|---|
| JP | 04279905 A | 10/1992 | |
| JP | 07299773 A | 11/1995 | |
| JP | 07314355 A | 12/1995 | |
| JP | 2002046088 A | 2/2002 | |
| JP | 2003080479 A | 3/2003 | |
| JP | 2003195886 A | * 7/2003 | |
| JP | 2004363987 A | 12/2004 | |
| JP | 2006289507 A | 10/2006 | |
| JP | 2006289508 A | 10/2006 | |
| JP | 2009025146 A | 2/2009 | |
| JP | 2012178092 A | 9/2012 | |
| JP | 2015046070 A | 3/2015 | |
| JP | 20150950045 A | 5/2015 | |
| JP | 2015164757 A | 9/2015 | |

OTHER PUBLICATIONS

Extended European Search Report for corresponding EP Application No. 17785664.8, 9 pages, dated Apr. 1, 2019.
Sangseok Yun, et al., "Engkey: Tele-education Robot" In: "Serious Games" Spinger International Puclishing, vol. 7072, pp. 142-152, Jan. 1, 2011.
International Search Report for related PCT Application No. PCT/JP2017/006943, 2 pages, dated Apr. 4, 2017.
Notification of Reason for Refusal for related application No. JP2016155889, 8 pages, dated Apr. 2, 2019.
Office Action for related U.S. Appl. No. 16/092,327, 8 pages, dated Apr. 3, 2020.
International Preliminary Report on Patentability and Written Opinion for related PCT Application No. PCT/JP2017/006943, 15 pages, dated Aug. 23, 2019.
International Search Report for corresponding PCT Application No. PCT/JP2017/007952, 4 pages, dated May 16, 2017.
Hiroyuki Fukushima, Yusuke Suzuki, Naotsune Hosono, "Tele-Meeting Robot System with Presenting Existences and Motions of the Remote Participants", The Japanese journal of ergonomics, vol. 44, special issue, pp. 300 to 301 (Jan. 2008).
International Preliminary Report on Patentability and Written Opinion for corresponding PCT Application No. PCT/JP2017/007952, 16 pages, dated Aug. 23, 2018.

* cited by examiner (a)

(b)

(a)

(b)

$\alpha = 1.0$
$\beta = 0.6$ (a)

(b)

(c)

| EMOTION INFORMATION | MOTION MODE |
|---|---|
| (1) HAPPINESS | RECIPROCATED 30 DEGREES BACK AND FORTH (IN AMPLITUDE OF 60 DEGREES) FROM STATE STANDING 90 DEGREES FROM MOTION INITIAL POSITION |
| (2) SURPRISE | RECIPROCATED 30 DEGREES UP AND DOWN (IN AMPLITUDE OF 60 DEGREES) FROM MOTION INITIAL POSITION |
| (3) AVERSION | STOPPED AT MOTION INITIAL POSITION |
| (4) ANGER | STOPPED IN STATE ROTATED 30 DEGREES UPWARDLY FROM MOTION INITIAL POSITION |
| (5) SORROW | STOPPED IN STATE ROTATED 30 DEGREES DOWNWARDLY (IN MINUS DIRECTION) FROM MOTION INITIAL POSITION |

ROBOT AND HOUSING

TECHNICAL FIELD

The present invention relates to a robot and a housing of the robot.

BACKGROUND ART

A head-mounted display (HMD) is utilized in various fields. By providing a head tracking function to the HMD and updating a display screen image in an interlocking relationship with the posture of the head of the user, an immerse feeling in the video world can be increased.

CITATION LIST

Patent Literature

[PTL 1] JP 2015-95045A

SUMMARY

Technical Problem

In recent years, a technology called tele-existence that utilizes a robot disposed at a distant place as an avatar of a user itself has appeared. If a robot at a distant place transmits image data or sound data of its surroundings and the data are reproduced at on user side, then the user can communicate with people therearound with such a realistic feeling that the user is at the place of the robot.

The inventor of the present application took notice of the possibility by collaboration of the tele-existence and the HMD and developed a technology that improves the convenience and the usefulness of a tele-existence system.

The present invention has been made in view of such a subject as described above, and it is an object of the present invention to provide a structure of a robot that is operated by remote control, a technology that processes viewing data acquired by a robot, and a technology for usefully utilizing viewing data acquired by a robot.

Solution to Problem

In order to solve the subject described above, a robot of a certain mode of the present invention includes an actuator apparatus and a housing whose posture can be changed by the actuator apparatus. The robot of this mode includes a movable member supported for motion on the housing, a motor provided in the housing, a transmission member configured to transmit rotation of the motor to the movable member, a driving controlling unit configured to control rotation of the motor, and a state information acquisition unit configured to acquire facial expression information and/or emotion information of a user who wears a head-mounted display apparatus thereon. The driving controlling unit controls rotation of the motor on the basis of the facial expression information and/or the emotion information.

Another mode of the present invention is a housing that includes a movable member supported for motion on the housing, a motor, and a transmission member configured to transmit rotation of the motor to the movable member. The transmission member is a member that deforms torsionally and elastically.

It is to be noted that also arbitrary combinations of the components described above and conversions of the representation of the present invention between a method, an apparatus, a system, a computer program, a recording medium in which the computer program is recorded, a data structure and so forth are effective as modes of the present invention.

BRIEF DESCRIPTION OF DRAWINGS

FIG. 22 is a view depicting an example of the retained substance of a motion table.

DESCRIPTION OF EMBODIMENT

Figure 1:
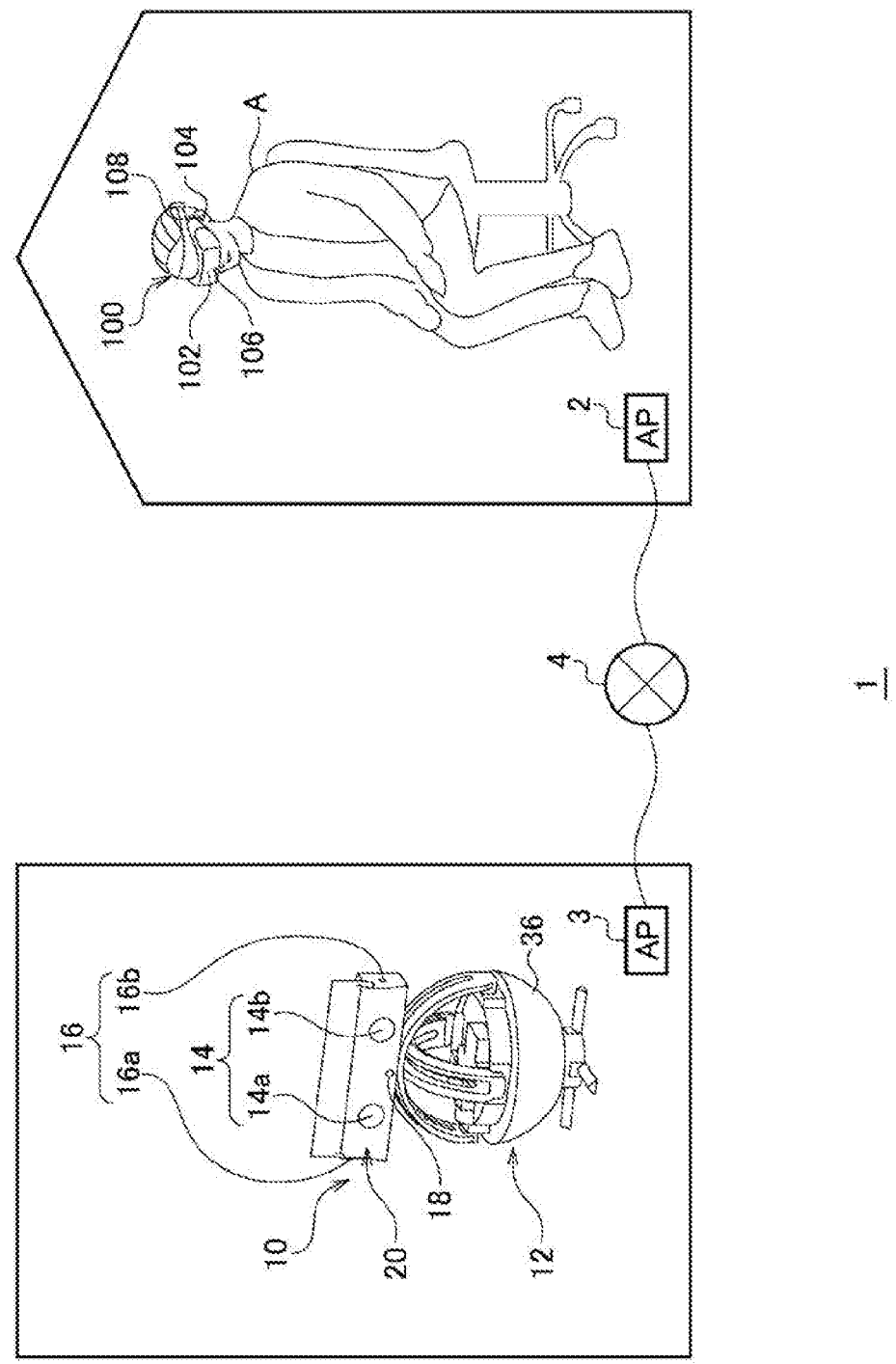
FIG. 1 is a view depicting an example of a configuration of an information processing system according to an embodiment.

FIG. 1 is a view depicting an example of a configuration of an information processing system 1 according to an embodiment. The information processing system 1 includes a robot 10 and a head-mounted display apparatus (HMD) 100 a user A wears on the head. The HMD 100 includes a display panel 102 for both eyes, earphones 104 for both ears, and a microphone 106. While the earphones 104 are adopted as sound outputting means, headphones having a shape in which they are placed on the ears may be adopted. The HMD 100 is connected to a network 4 through an access point (AP) 2. While the AP 2 has functions as a wireless access point and a router and the HMD 100 is connected to the AP 2 through a known wireless communication protocol, the HMD 100 may be connected to the AP 2 through a cable.

The robot 10 includes an actuator apparatus 12 and a housing 20 actuated by the actuator apparatus 12 such that the posture thereof can be changed. In the housing 20, a right camera 14a, a left camera 14b, a right microphone 16a, a left microphone 16b, and a speaker 18 are incorporated. In the following description, where the right camera 14a and the left camera 14b are not specifically distinguished from each other, each of them is referred to as "camera 14," and where the right microphone 16a and the left microphone 16b are not specifically distinguished from each other, each of them is referred to as "microphone 16." In the embodiment, the cameras 14 and the microphones 16 are provided in the housing 20 that is actuated by the actuator apparatus 12, the speaker 18 may be provided in a semispherical housing 36 of the actuator apparatus 12. The robot 10 is coupled to the network 4 through an access point (AP) 3. While the robot 10 is connected to the AP 3 through a known wireless communication protocol, the robot 10 may be coupled to the AP 3 otherwise through a cable.

In the information processing system 1, the HMD 100 and the robot 10 are connected for communication to each other through the network 4. It is to be noted that, where the HMD 100 and the robot 10 exist nearby to each other, the HMD 100 and the robot 10 may be connected directly for communication by wireless communication or wired communication without through an AP. In the information processing system 1, the robot 10 operates so to move as an avatar of the user A. A motion of the HMD 100 worn by the user A is transmitted to the robot 10, and the actuator apparatus 12 moves the housing 20 in an interlocking relationship with the motion of the HMD 100. For example, if the user A shakes the head in the forward or rearward direction, then the actuator apparatus 12 moves the housing 20 so as to be shaken in the forward and rearward direction, and, if the user shakes the head in the leftward or rightward direction, then the actuator apparatus 12 moves the housing 20 so as to be shaken in the leftward or rightward direction. Consequently, a person around the robot 10 can communicate with the user A with such a sense that the user A exists at the site.

The right camera 14a and the left camera 14b are disposed on the front face of the housing 20 in a predetermined spaced relationship from each other in the horizontal direction. The right camera 14a and the left camera 14b configure a stereo camera, and the right camera 14a picks up an image for the right eye in a predetermined cycle and the left camera 14b picks up an image for the left eye in the predetermined cycle. The picked up right eye image and left eye image are transmitted to the HMD 100 of the user A on the real time basis. The HMD 100 displays the received right eye image on a display panel for the right eye and displays the received left eye image on a display panel for the left eye. Consequently, the user A can watch a video in a direction in which the housing 20 of the robot 10 is directed on the real time basis.

The right microphone 16a and the left microphone 16b are disposed in the housing 20 in a predetermined spaced relationship from each other in the horizontal direction. The right microphone 16a and the left microphone 16b configure a stereo microphone and are disposed in a predetermined spaced relationship from each other in the horizontal direction such that periods of time until sound reaches differ depending upon the position of a sound source. The difference between reaching time periods of sound appear as a phase difference between sound signals generated by the right microphone 16a and the left microphone 16b. It is to be noted that, in order to increase the phase difference between sound signals of the right microphone 16a and the left microphone 16b, it is preferable to dispose the right microphone 16a and the left microphone 16b in a spaced relationship from each other by a distance as great as possible, and particularly, on the opposite side faces of the housing 20.

Sound signals generated by the right microphone 16a and the left microphone 16b are processed in such a manner as hereinafter described and transmitted as sound data for the right ear and sound data for the left ear to the HMD 100 of the user A on the real time basis. The HMD 100 outputs the received right ear sound data from the earphone 104 for the right ear and outputs the received left ear sound data from the earphone 104 for the left ear. Consequently, the user A can hear sound around the robot 10 on the real time basis.

Although it is known that human beings sense the position of a sound source in the leftward and rightward direction from the difference in reaching time period of sound waves to both ears, the position of the sound source is actually sensed depending not only upon the difference in reaching time period but also upon the shape of the auricle for collecting sound waves, the shape of the external ear canal for transmitting sound waves to the tympanum and so forth. Further, in the case where a sound source exists on the right side or the left side with respect to the front of a human, in order for sound waves to reach the auricle on the distant side in comparison with the auricle on the near side, since the face of the human is positioned on a route, the reaching time difference of sound waves becomes greater than the distance difference from the sound source.

On the other hand, since the front face of the housing 20 has a flat shape and the microphones 16 do not have a shape corresponding to the auricle or the external ear canal, the sound reaching time difference substantially corresponds to the distance difference between the sound source and both microphones. While, in the embodiment, the right microphone 16a and the left microphone 16b are disposed on the opposite side faces of the housing 20 so as to be provided at positions spaced by a distance as great as possible from each other, it has turned out by an experiment by the inventor of the present application that, even if a sound signal generated by the right microphone 16a and a sound signal generated by the left microphone 16b are amplified and output from the earphone for the right ear and the earphone for the left ear, respectively, the position of the sound source in the leftward and rightward direction cannot be sensed well.

In particular, it has been turned out by the experiment that, in comparison with sound that humans are accustomed to hear every day, the phase difference between sound signals generated by the right microphone 16a and the left microphone 16b is so small as to perceive the leftward or rightward direction. Therefore, the robot 10 includes a mechanism for providing sound data made closer to sound that can be heard with both ears of a human being by amplifying the phase difference between the sound signals of the right microphone 16a and the left microphone 16b to the HMD 100. This mechanism is hereinafter described.

In the HMD 100, the microphone 106 generates a sound signal emitted by the user A. The sound data by the user A is transmitted on the real time basis to the robot 10, and the robot 10 outputs the received sound data to the speaker 18. Consequently, a person around the robot 10 can hear the voice emitted by the user A on the real time basis.

In this manner, in the information processing system 1, the robot 10 is remotely controlled by the user A to reproduce a motion of the face or voice of the user A, and the user A can enjoy an image or sound around the robot through the HMD 100. Further, the user A and the person around the robot 10 can communicate with each other on the real time basis. Such an information processing system 1 as described above is utilized usefully in various environments.

Figure 2:
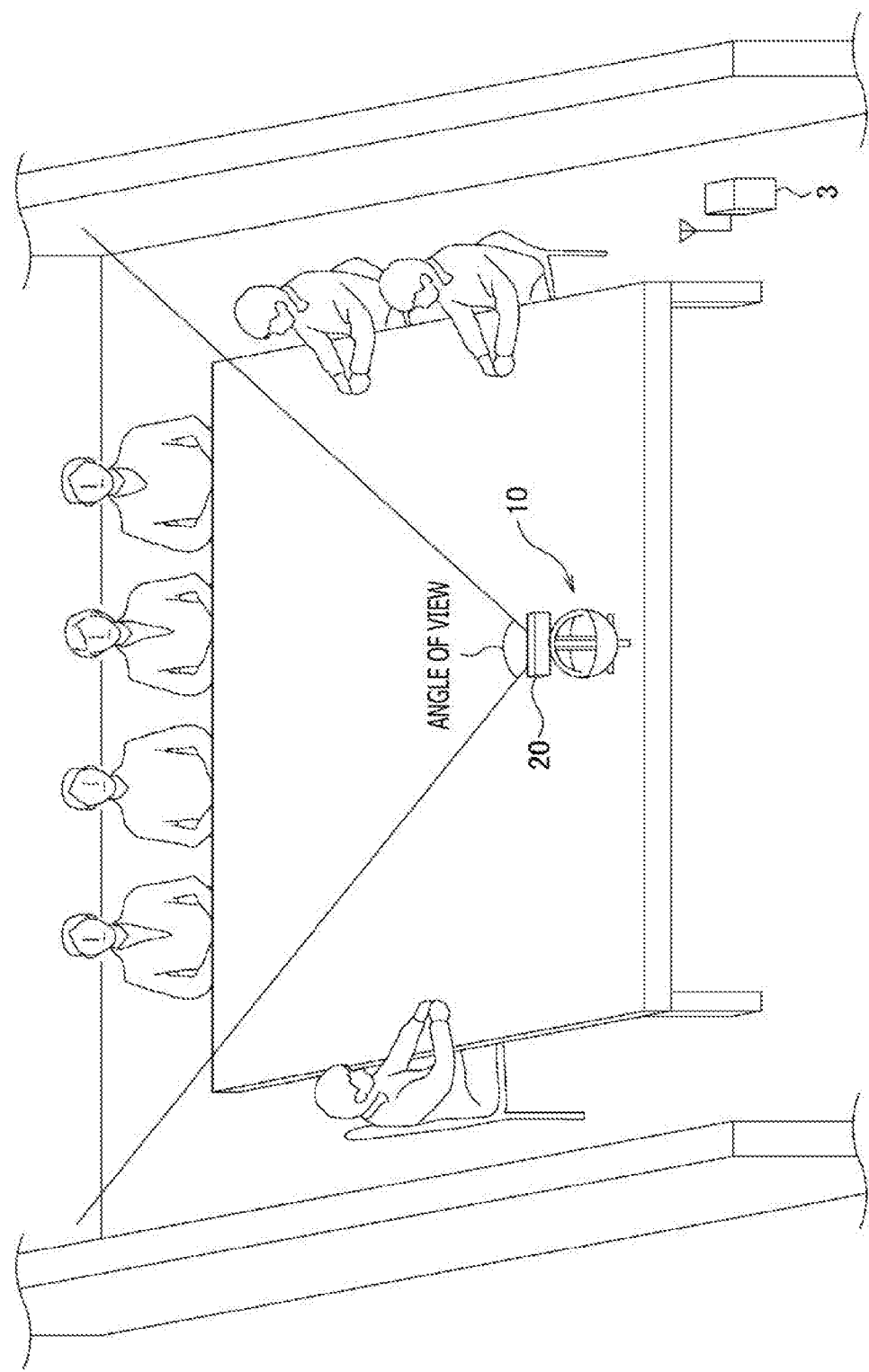
FIG. 2 is a view depicting an example of a usage scene of a robot.

FIG. 2 depicts an example of a usage scene of the robot 10. In this example, a meeting is held in a room and the robot 10 that is an avatar of the user A is disposed on a table. In this example, the robot 10 is directed toward four members in front of the robot 10 and the cameras 14 pick up an image of the four members in front of the robot 10 within an angle of view. The robot 10 transmits the picked up images of the cameras 14 to the HMD 100 of the user A on the real time basis. The user A participates in the meeting while watching the situation of the room through the display panel 102 of the HMD 100 and, if the user A speaks, then the voice of the user A is transmitted to the robot 10 on the real time basis and the robot 10 outputs the voice of the user A from the speaker 18.

Further, as described above, the robot 10 transmits sound data in which the phase difference between the sound signals generated by the left and right microphones 16 is amplified to the HMD 100 on the real time basis. Consequently, the user A can sense whether a person who speaks in the room is positioned on the right side, on the left side, or in front of the housing 20 with respect to the direction in which the housing 20 is directed. If the user A senses that a person on the right side with respect to the user A itself speaks, then the user A would turn the head to the right to face the right side. At this time, since also the housing 20 of the robot 10 faces the right side in an interlocking relationship with the motion of the head of the user A, the cameras 14 pick up an image of the participant sitting on the right side.

In this manner, since the robot 10 that is an avatar of the user A interlocks with a motion of the user A, the user A can participate in the meeting with such a sense that the user exists in the room while the user A is at a distant place. Further, also participants actually existing in the room can communicate with the user A without a sense of incongruity from the voice of the user A or a motion of the housing 20. It is to be noted that the usage scene depicted in FIG. 2 is an example, and, also in other usage scenes, the user A can acquire viewing data from the robot 10 while the user A exists at a distant place.

Figure 3:
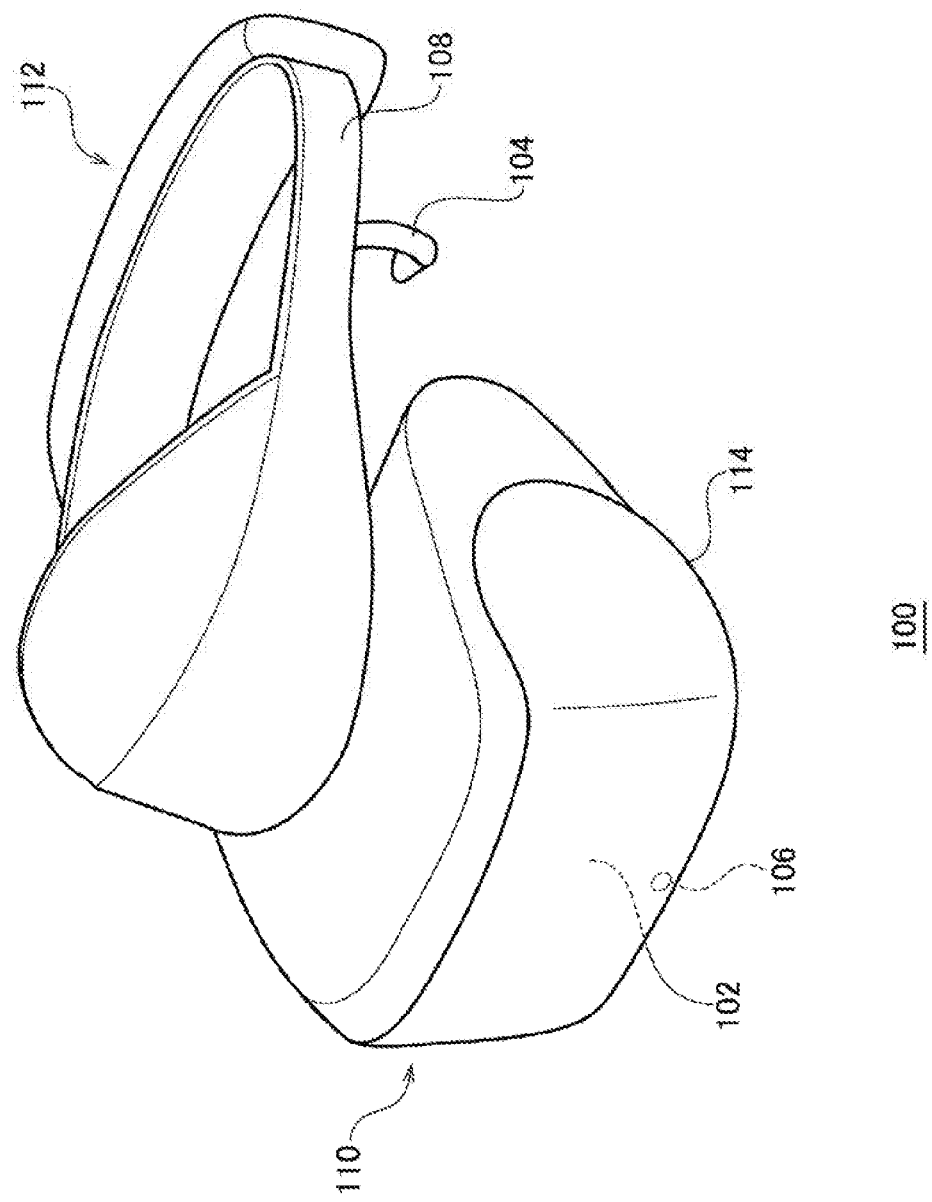
FIG. 3 is a view depicting an example of an appearance shape of an HMD.

FIG. 3 depicts an example of an appearance shape of the HMD 100. In this example, the HMD 100 is configured from an output mechanism unit 110 and a mounting mechanism unit 112. The mounting mechanism unit 112 includes a mounting band 108 that extends, where it is worn by the user, around the head to fix the HMD 100 to the head. The mounting band 108 is configured from a material or a structure that allows adjustment of the mounting band 108 in accordance with the periphery of the head of the user.

The output mechanism unit 110 includes a housing 114 having a shape for covering the left and right eyes of a user in a state in which the user wears the HMD 100, and the display panel 102 is provided at a position facing the eyes in the inside of the housing 114. The display panel 102 may be a liquid crystal panel, an organic electroluminescence (EL) panel or the like. In the inside of the housing 114, a pair of left and right optical lenses are provided which are positioned between the display panel 102 and the eyes of the user and increases the viewing angle of the user.

The HMD 100 further includes the earphones 104 that are to be inserted into the ears of the user when the HMD 100 is worn. It is to be noted that the earphones 104 are an example of sound outputting means, and the HMD 100 may include a headphone. At this time, the HMD 100 and the headphone may be configured integrally or may be configured as separate members each other.

The HMD 100 transmits sensor information detected by a posture sensor and sound data obtained by encoding a sound signal from the microphone 106 to the robot 10, and receives image data and sound data generated by the robot 10 and outputs the received data from the display panel 102 and the earphones 104.

It is to be noted that, while the HMD 100 depicted in FIG. 3 is an immersive type (non-transmission type) display apparatus that fully covers both eyes, the HMD 100 may otherwise be a transmission type display apparatus. Further, while the shape may be that of such a hat type as depicted in FIG. 3, it may be that of the glasses type. It is to be noted that the HMD 100 may be configured not only from a head mounting display apparatus for exclusive use but also from a terminal apparatus that includes a display panel, a microphone, and a speaker and a housing that fixes the display panel of the terminal apparatus at a position just in front of the user. The terminal apparatus may be an apparatus including a comparatively small display panel like, for example, a smartphone or a portable game machine.

Figure 4:
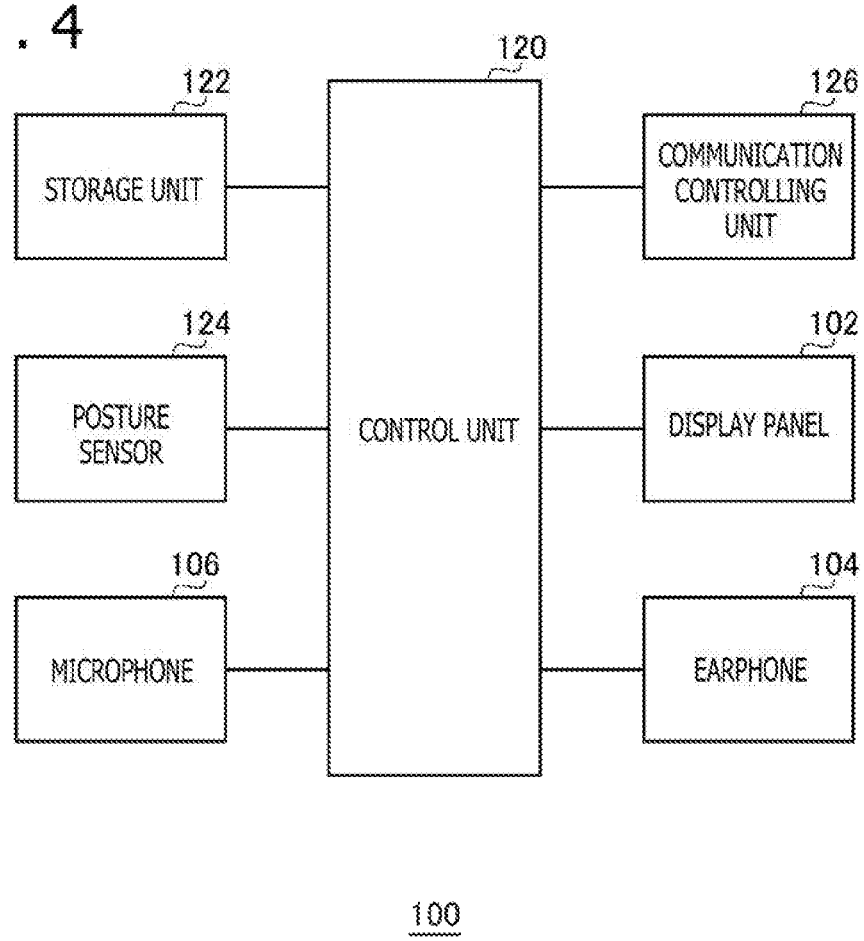
FIG. 4 is a view depicting functional blocks of the HMD.

FIG. 4 depicts functional blocks of the HMD 100. A control unit 120 is a main processor that processes and outputs various signals such as an image signal, an audio signal, and sensor information, data, and commands. A storage unit 122 temporarily stores data, commands and so forth to be processed by the control unit 120. A posture sensor 124 detects posture information such as a rotational angle, a tilt and so forth of the HMD 100 in a predetermined cycle. The posture sensor 124 at least includes a three-axis acceleration sensor and a three-axis gyroscopic sensor. The microphone 106 converts voice of the user into an electric signal to generate a sound signal.

A communication controlling unit 126 transmits and receives signals and data to and from the robot 10 by wired communication or wireless communication through a network adapter or an antenna. The communication controlling unit 126 receives posture information detected by the posture sensor 124 and sound data obtained by encoding a sound signal from the microphone 106 from the control unit 120 and transmits the received data to the robot 10. Further, the communication controlling unit 126 receives and supplies image data and sound data from the robot 10 to the control unit 120. If image data and sound data are received from the robot 10, then the control unit 120 supplies the image data to the display panel 102 so as to be displayed and supplies the sound data to the earphone 104 so as to be output as sound.

Figure 5:
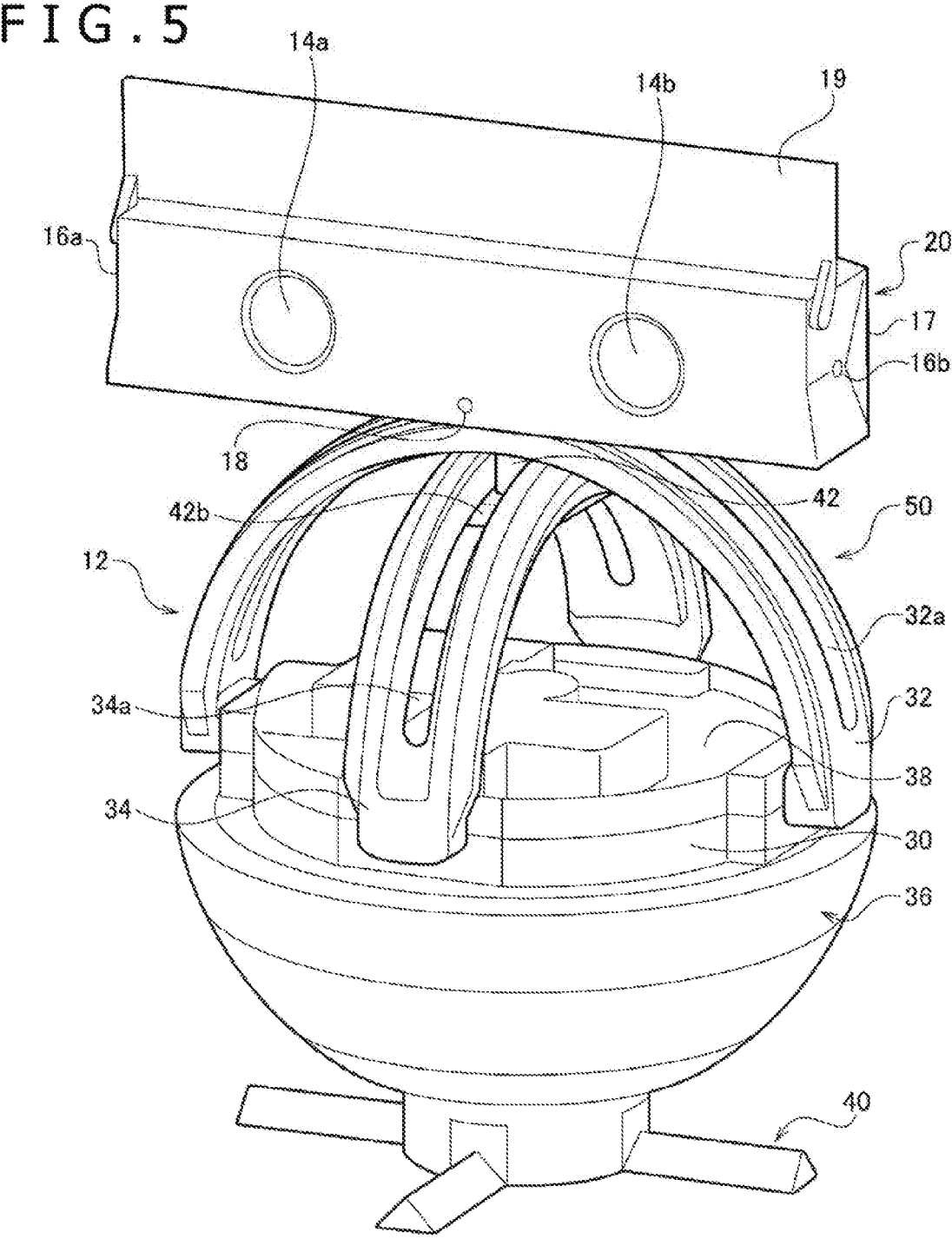
FIG. 5 is a view depicting an appearance configuration of the robot.

FIG. 5 depicts an appearance configuration of the robot 10. The housing 20 accommodates the cameras 14, the microphones 16, and the speaker 18 therein. The cameras 14 and the speaker 18 are provided on the front face of the housing, and the microphones 16 are provided on side faces of the housing. The cameras 14, the microphones 16, and the speaker 18 operate with power supplied thereto through a power line (not depicted) from a power supply apparatus accommodated in the housing 36.

The housing 20 has a protective cover 19 such that, in a state in which the robot 10 is not used, namely, in a state in which the power supply to the robot 10 is turned off, the protective cover 19 is disposed at a closing position at which it covers the front face of the housing to protect the cameras 14 and the speaker 18. The protective cover 19 is attached such that it has pivots provided in an inwardly projecting manner at the opposite ends in the longitudinal direction of the protective cover 19 and inserted in a pair of pivot holes in the side walls of the housing. Consequently, the protective cover 19 is attached for pivotal motion around the axis of the pivots with respect to the housing 20. In the state depicted in FIG. 5, the protective cover 19 is disposed at an open position rotated approximately by 180 degrees from the closing position such that the cameras 14 are exposed and can pick up an image of the surroundings. The protective cover 19 preferably has a stopper mechanism by which it is fixed at the open position.

It is to be noted that, in a state in which the robot 10 is used, the protective cover 19 may be driven and controlled in response to the emotion or the tilt of the head of a user who wears the HMD 100. In this case, a motor serving as a driving unit is provided in the housing 20 and can control the operation of the protective cover 19 by connecting the motor shaft to the pivots of the protective cover 19. In this case, the stopper mechanism may not be provided, and the protective cover 19 may be rotatable within a range of approximately 270 degrees from the closing position.

The housing 20 is supported such that the posture thereof can be changed by the actuator apparatus 12. The actuator apparatus 12 includes a leg unit 40, the semispherical housing 36 supported at an upper portion of the leg unit 40, and a driving mechanism 50 for driving the housing 20. The driving mechanism 50 includes a first arc-shaped arm 32 having a first elongated through-hole 32a formed in the longitudinal direction thereof, a second arc-shaped arm 34 having a second elongated through-hole 34a formed in the longitudinal direction thereof, and a pedestal 30 that supports the first arc-shaped arm 32 and the second arc-shaped arm 34 for pivotal motion in a state in which the first arc-shaped arm 32 and the second arc-shaped arm 34 cross with each other. The pedestal 30 is covered on the upper side thereof with a cover 38, and in a space covered with the cover 38, motors for individually pivoting the first arc-shaped arm 32 and the second arc-shaped arm 34 are disposed. It is to be noted that the pedestal 30 is supported for pivotal motion with respect to the housing 36, and a motor for rotating the pedestal 30 is disposed in the housing 36.

The first arc-shaped arm 32 and the second arc-shaped arm 34 are formed in a semicircular shape and are supported at the opposite end portions thereof on the pedestal 30 such that they have the same center of rotation. The diameter of the semicircular first arc-shaped arm 32 is a little greater than the diameter of the semicircular second arc-shaped arm 34, and the first arc-shaped arm 32 is disposed on the outer periphery side of the second arc-shaped arm 34. The first arc-shaped arm 32 and the second arc-shaped arm 34 may be disposed so as to be orthogonal to each other on the pedestal 30. In the embodiment, a line interconnecting the opposite end portions of the first arc-shaped arm 32 supported on the pedestal 30 and a line interconnecting the opposite end portions of the second arc-shaped arm 34 supported on the pedestal 30 are orthogonal to each other. An insertion member 42 is inserted in the first elongated through-hole 32a and the second elongated through-hole 34a and disposed at the crossing position of the first elongated through-hole 32a and the second elongated through-hole 34a. The insertion member 42 slidably moves in the first elongated through-hole 32a and the second elongated through-hole 34a by pivotal motion of the first arc-shaped arm 32 and the second arc-shaped arm 34.

Figure 6:
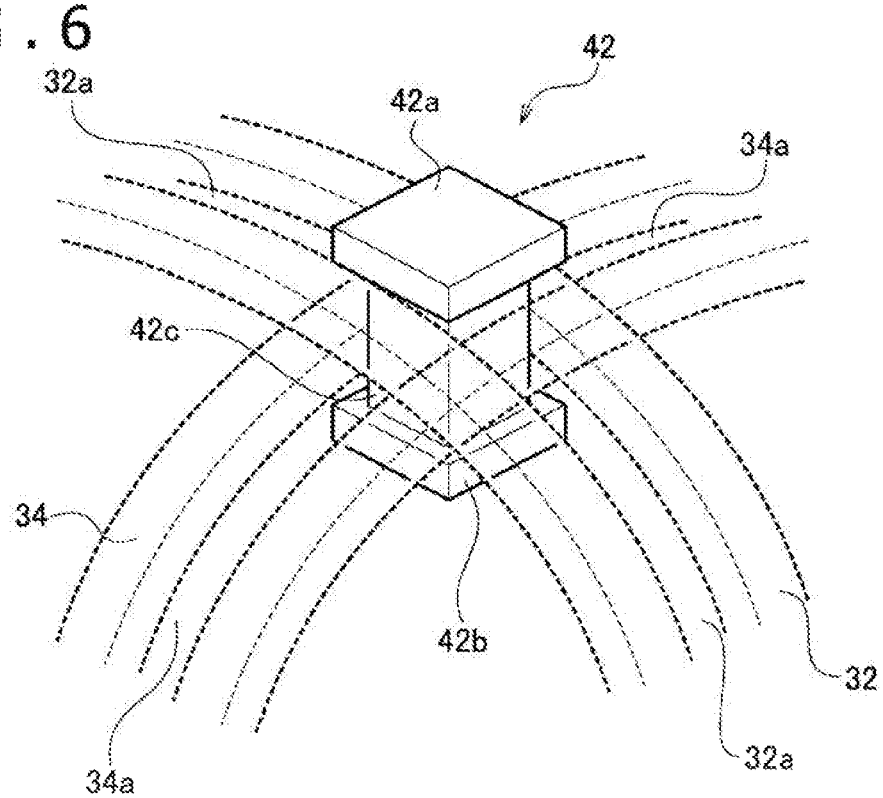
FIG. 6 is a view depicting a configuration of an insertion member.

FIG. 6 depicts a configuration of the insertion member 42. The insertion member 42 includes a first restriction portion 42a having a width greater than that of the first elongated through-hole 32a and a second restriction portion 42b having a width greater than the second elongated through-hole 34a such that it maintains the insertion state thereof in the first elongated through-hole 32a and the second elongated through-hole 34a. The first restriction portion 42a is disposed on the upper side with respect to the first elongated through-hole 32a while the second restriction portion 42b is disposed on the lower side with respect to the second elongated through-hole 34a to prevent the insertion member 42 from dropping out of the first elongated through-hole 32a and the second elongated through-hole 34a. The insertion member 42 may be structured such that, when the insertion member 42 is to be attached to the first elongated through-hole 32a and the second elongated through-hole 34a, one of the first restriction portion 42a and the second restriction portion 42b is formed as a separate member from a stem portion 42c, and in a state in which the stem portion 42c is inserted in the first elongated through-hole 32a and the second elongated through-hole 34a, the first restriction portion 42a or the second restriction portion 42b is fixed to an end portion of the stem portion 42c.

The stem portion 42c is a portion to be inserted in the first elongated through-hole 32a and the second elongated through-hole 34a and is normally positioned at the crossing location of the first elongated through-hole 32a and the second elongated through-hole 34a. The stem portion 42c is restricted against rotation in the first elongated through-hole 32a and in the second elongated through-hole 34a. In the embodiment, the stem portion 42c has a rectangular cross section having a width a little greater than the width of the first elongated through-hole 32a and the second elongated through-hole 34a such that, although rotation of the stem portion 42c is restricted in the first elongated through-hole 32a and in the second elongated through-hole 34a, rotation of the stem portion 42c may be restricted by some other means. For example, a rail may be provided on an inner circumferential face of the second arc-shaped arm 34 while a rail groove is provided on the second restriction portion 42b such that rotation of the stem portion 42c is restricted through fitting engagement between the rail and the rail groove. The housing 20 is attached to the first restriction portion 42a, and since rotation of the stem portion 42c is restricted, the housing 20 can be maintained in a desired posture.

It is to be noted that the stem portion 42c is slidably movable in the first elongated through-hole 32a and in the second elongated through-hole 34a because it has a width smaller than the width of the first elongated through-hole 32a and the second elongated through-hole 34a. Consequently, the insertion member 42 can move along the first elongated through-hole 32a and can move along the second elongated through-hole 34a by rotation of the first arc-shaped arm 32 and the second arc-shaped arm 34, respectively.

Figure 7:
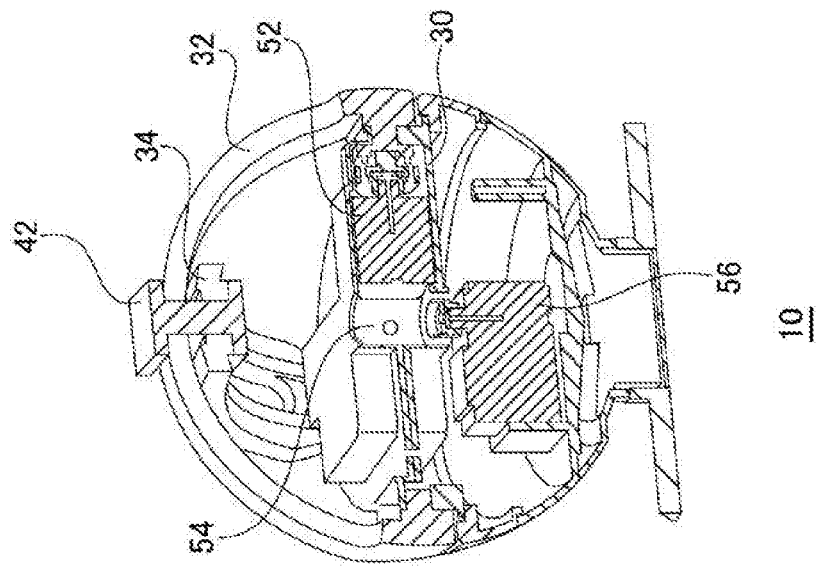
FIG. 7 depicts views illustrating a cross section of the robot.
Figure 7:
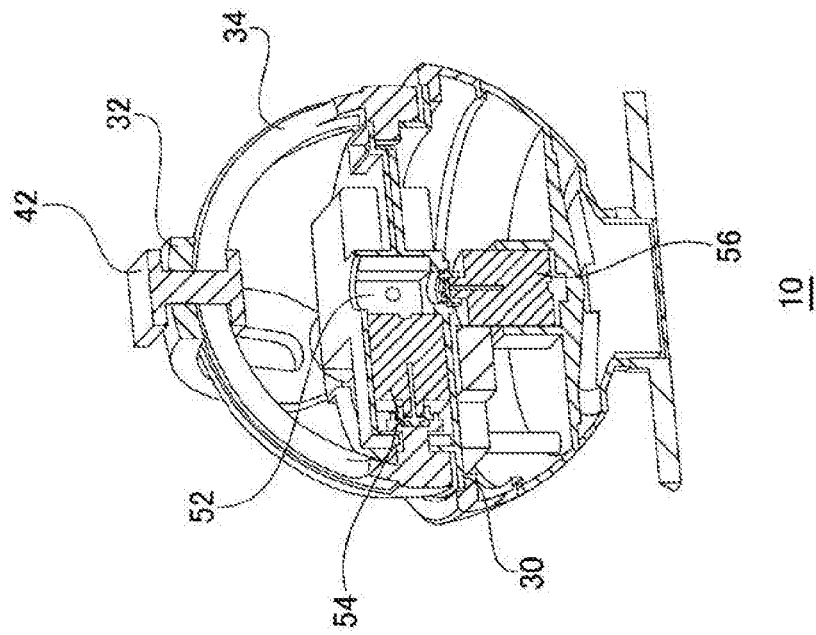

FIG. 7 depicts a cross section of the robot 10. FIG. 7 mainly depicts a driving system of the robot 10 and omits illustration of a control circuit board, a memory, a wiring line and so forth. FIG. 7(a) depicts a cross section taken along the second arc-shaped arm 34 in a state in which the first arc-shaped arm 32 and the second arc-shaped arm 34 are erected uprightly by 90 degrees with respect to the pedestal 30, and FIG. 7(b) depicts a cross section taken along the first arc-shaped arm 32 in the state in which the first arc-shaped arm 32 and the second arc-shaped arm 34 are erected uprightly by 90 degrees with respect to the pedestal 30.

A first motor 52 is provided for rotating the first arc-shaped arm 32, and a second motor 54 is provided for rotating the second arc-shaped arm 34. The first motor 52 and the second motor 54 are disposed on the pedestal 30 such that, when the pedestal 30 rotates, also the first motor 52 and the second motor 54 rotate together with the pedestal 30. A third motor 56 is provided for rotating the pedestal 30 and is disposed in the housing 36. The first motor 52, the second motor 54, and the third motor 56 are rotated by power supplied from a power supply apparatus not depicted.

Since the first motor 52 rotates the first arc-shaped arm 32 and the second motor 54 rotates the second arc-shaped arm 34 and besides the third motor 56 rotates the pedestal 30, the actuator apparatus 12 can change the direction and the posture of the housing 20 attached to the insertion member 42.

Figure 8:
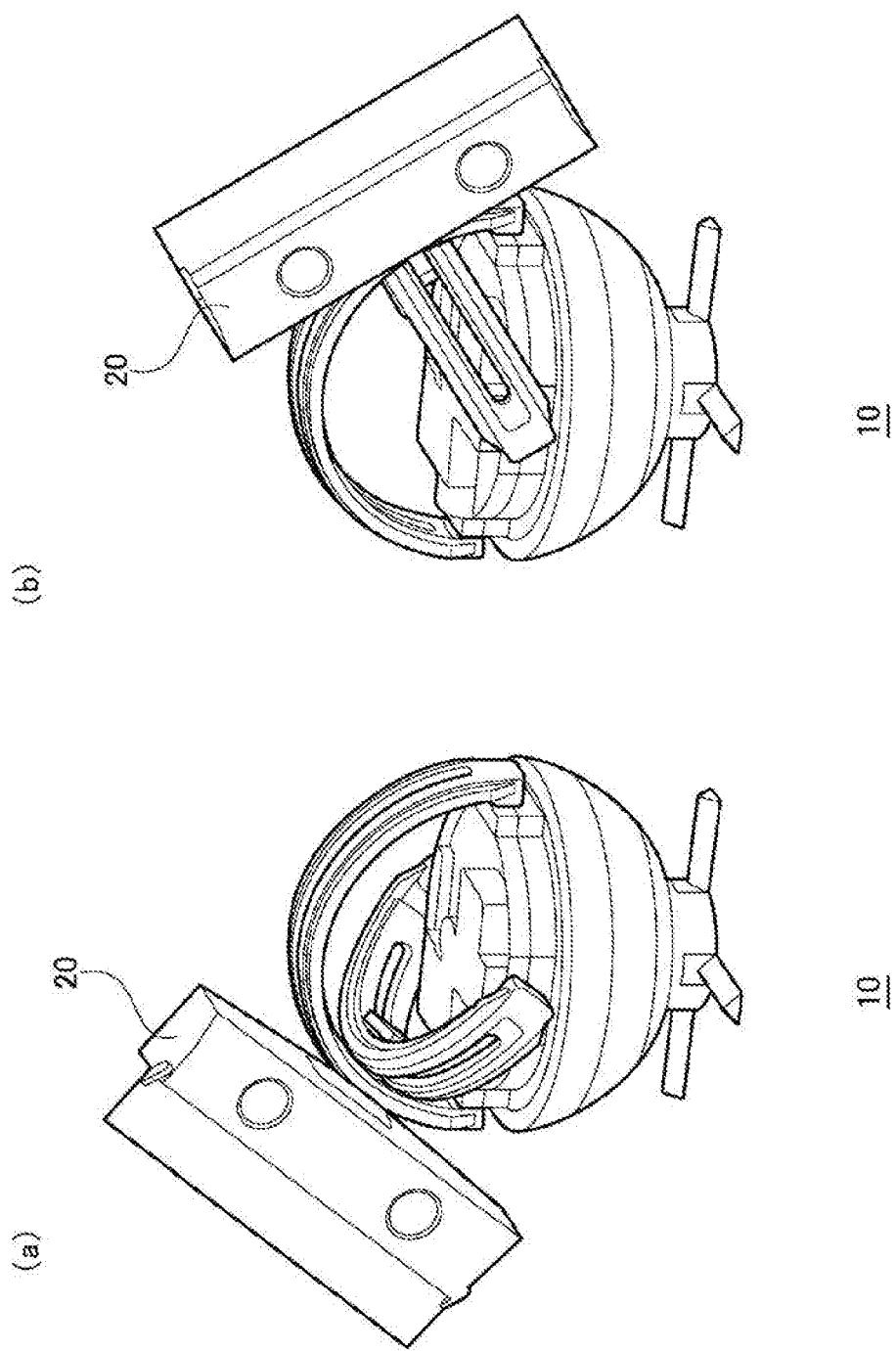
FIG. 8 depicts views illustrating an example of the posture of a housing of the robot.
Figure 9:
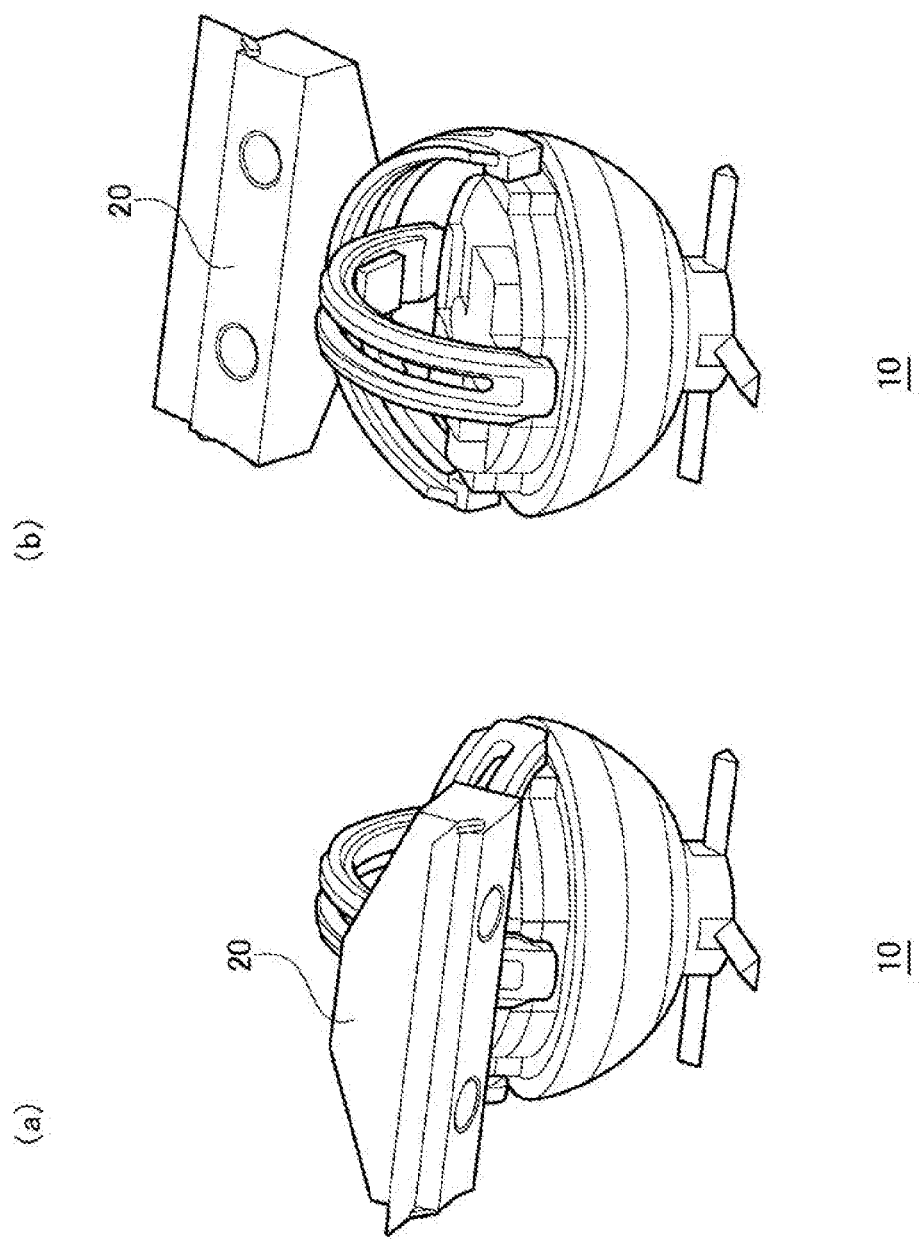
FIG. 9 depicts views illustrating another example of the posture of the housing of the robot.

FIGS. 8 and 9 are views depicting examples of the posture of the housing 20 of the robot 10.

FIG. 8(a) and FIG. 8(b) depict an example in which the housing 20 is tilted in the leftward or rightward direction. FIG. 9(a) and FIG. 9(b) depict an example in which the housing 20 is tilted in the forward or rearward direction. The driving mechanism 50 of the robot 10 can cause the housing 20 to take an arbitrary posture. The posture of the housing 20 is controlled by adjustment of the driving amount of the first motor 52 and the second motor 54, and the direction of the housing 20 is controlled by adjusting the driving amount of the third motor 56.

Figure 10:
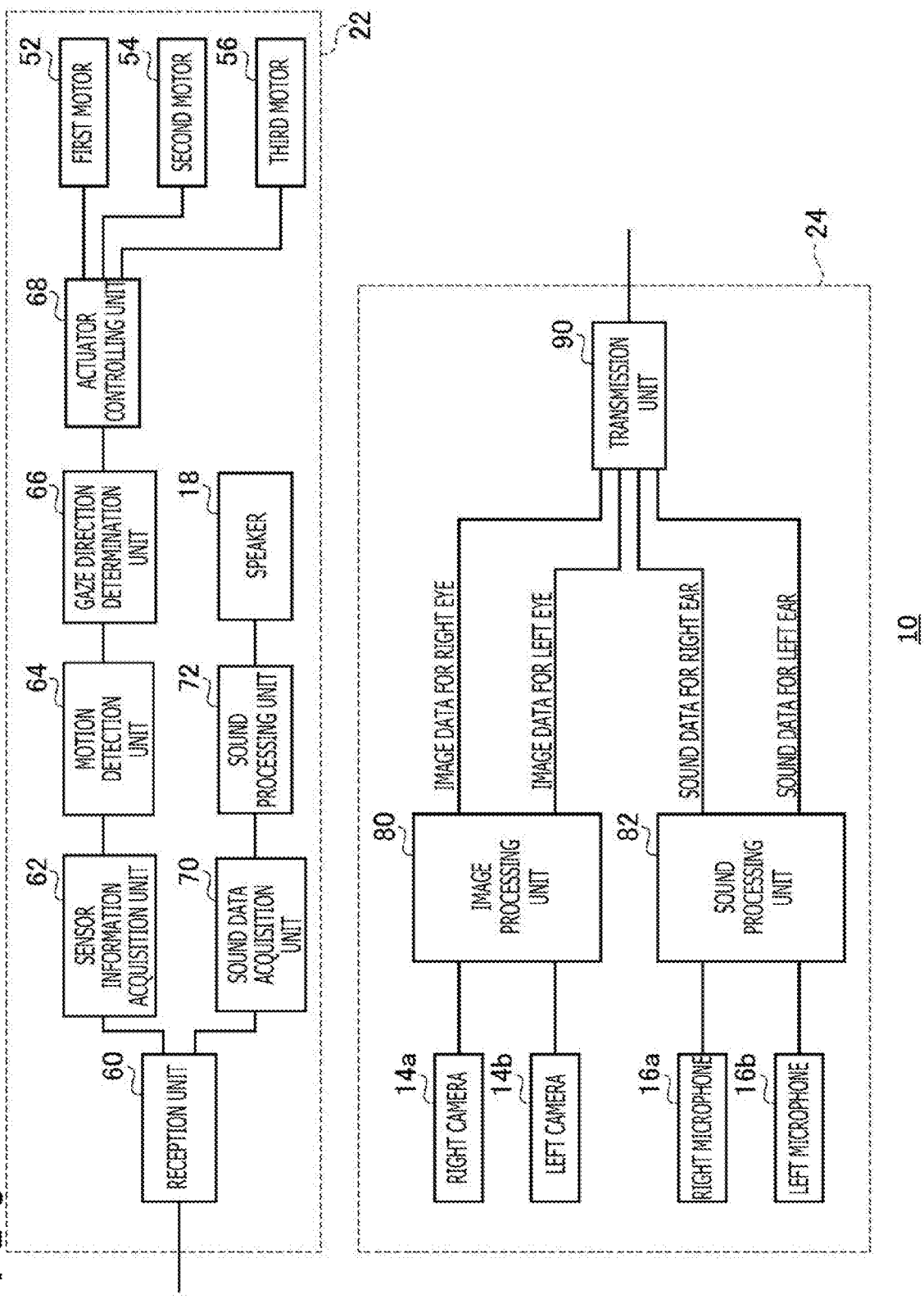
FIG. 10 is a view depicting functional blocks of the robot.

FIG. 10 depicts functional blocks of the robot 10. The robot 10 includes an input system 22 that accepts and processes an input from the outside, and an output system 24 that processes outputting to the outside. The input system 22 includes a reception unit 60, a sensor information acquisition unit 62, a motion detection unit 64, a gaze direction determination unit 66, an actuator controlling unit 68, a sound data acquisition unit 70, and a sound processing unit 72. Meanwhile, the output system 24 includes an image processing unit 80, a sound processing unit 82, and a transmission unit 90.

The elements indicated as functional blocks that perform various processes in FIG. 10 can be configured, in hardware, from a circuit block, a memory, and some other large scale integrations (LSIs) and are implemented, in software, by a program loaded in the memory and so forth. Accordingly, it is recognized by those skilled in the art that the functional blocks can be implemented in various forms only from hardware, only from software, or from a combination of hardware and software, and they are not restricted to any of them.

As described hereinabove, the HMD 100 transmits sensor information detected by the posture sensor 124 and sound data obtained by encoding a sound signal generated by the microphone 106, and the reception unit 60 receives the sensor information and the sound data. The sound data acquisition unit 70 acquires the received sound data, and the sound processing unit 72 carries out a sound process and outputs the sound data from the speaker 18. Consequently, the robot 10 can reproduce the voice of the user A on the real time basis, and a person around the robot 10 can hear the voice of the user A.

The sensor information acquisition unit 62 acquires posture information detected by the posture sensor 124 of the HMD 100. The motion detection unit 64 detects the posture of the HMD 100 worn on the head of the user A. The gaze direction determination unit 66 determines the gaze direction of the cameras 14 of the housing 20 in response to the posture of the HMD 100 detected by the motion detection unit 64.

The motion detection unit 64 performs a head tracking process for detecting the posture of the head of the user on which the HMD 100 is worn. The head tracking process is performed in order to cause the field of view, which is to be displayed on the display panel 102 of the HMD 100, to interlock with the posture of the head of the user, and by the head tracking process of the embodiment, the rotational angle with respect to a horizontal reference direction and the tilt angle with respect to a horizontal plane of the HMD 100 are detected. The horizontal reference direction may be set as a direction in which the HMD 100 is directed, for example, when the power supply to the HMD 100 is turned on.

The gaze direction determination unit 66 determines the gaze direction in response to the posture of the HMD 100 detected by the motion detection unit 64. This gaze direction is a gaze direction of the user A and hence is a gaze direction (optical axis direction) of the cameras 14 of the robot 10 that is an avatar of the user A.

In order to cause the gaze direction (optical axis direction) of the cameras 14 to interlock with the gaze direction of the user A, it is necessary to set a reference posture of the robot 10 in advance. While FIG. 5 depicts a state in which the first arc-shaped arm 32 and the second arc-shaped arm 34 are erected uprightly by 90 degrees with respect to the pedestal 30, this state may be set as a horizontal direction while the direction in which the front face of the housing 20 is directed when the power supply to the robot 10 is turned on is set as the horizontal reference direction. It is to be noted that the robot 10 may have a posture sensor similarly to the HMD 100 such that the horizontal direction can be set autonomously.

In a state in which the reference posture of the HMD 100 and the robot 10 is set, the gaze direction determination unit 66 may determine the rotational angle and the tilt angle detected by the motion detection unit 64 as they are as the gaze direction (optical axis direction) of the cameras 14. When the motion detection unit 64 detects the rotational angle and the tilt angle of the HMD 100, the gaze direction determination unit 66 determines the gaze direction of the HMD 100 as a vector (x, y, z) of a three-dimensional coordinate system, and at this time, the gaze direction determination unit 66 may determine the gaze direction of the cameras 14 of the robot 10 as same (x, y, z) or may determine (x', y', z') that is a form of (x, y, z) to which some correction is applied.

The actuator controlling unit 68 controls the direction of the cameras 14 such that it becomes the gaze direction determined by the gaze direction determination unit 66. In particular, the actuator controlling unit 68 adjusts the power to be supplied to the first motor 52, the second motor 54, and the third motor 56 such that the motion of the housing 20 follows up the motion of the HMD 100. The motor driving control by the actuator controlling unit 68 is carried out on the real time basis, and accordingly, the direction of the housing 20 is moved in a similar manner to the direction of the line of sight of the user A.

According to the actuator apparatus 12 of the embodiment, although the housing 20 is driven with reference to the center of pivotal motion of the first arc-shaped arm 32 and the second arc-shaped arm 34, this motion indicates a motion same as that of the head of a person. The actuator apparatus 12 reproduces the motion of the head of the user A by such a simple structure that two semicircular arms cross with each other.

A person transmits its intention by a motion of the head. For example, although, in Japan, if the head is shaken vertically, then this represents the affirmation but if the head is shaken sideways, then this represents the negation, since the actuator apparatus 12 moves the housing 20 similarly to a motion of the head of the user A, a person around the robot 10 can feel the intention of the user A from the motion of the housing 20. Therefore, that the motion of the head of the user A can be reproduced by a simple structure is very useful in the tele-existence technology.

Now, the output system 24 is described.

In the output system 24, the right camera 14a and the left camera 14b are directed in directions controlled by the actuator apparatus 12 and pick up images within individual angles of view. The right camera 14a and the left camera 14b may be disposed in a spaced relationship from each other such that the distance therebetween becomes equal to an average distance between both eyes of an adult. Right eye image data picked up by the right camera 14a and left eye image data picked up by the left camera 14b are transmitted from the transmission unit 90 to the HMD 100, in which they are displayed in the right half and the left half of the display panel 102, respectively. Those images form a parallax image as viewed from the right eye and the left eye and are displayed in the two divisional regions of the display panel 102, by which a stereoscopic image can be formed. It is to be noted that, since the user A views the display panel 102 through an optical lens, the image processing unit 80 may generate image data whose optical distortion by the lenses is corrected in advance and supply the image data to the HMD 100.

The right camera 14a and the left camera 14b perform image pickup in a predetermined cycle (for example, in 1/60 second), and the transmission unit 90 transmits image data without delay to the HMD 100. Consequently, the user A can view a surrounding situation of the robot 10 on the real time basis, and can view a desired direction by changing the direction of the face.

The right microphone 16a and the left microphone 16b convert sound around the robot 10 into an electric signal to generate sound signals. In the following description, the sound signal generated by the right microphone 16a is referred to as "first sound signal," and the sound signal generated by the left microphone 16b is referred to as "second sound signal." Since the right microphone 16a and the left microphone 16b are disposed in a spaced relationship from each other in the horizontal direction on the housing 20 as described hereinabove, a phase difference appears between the first sound signal generated by the right microphone 16a and the second sound signal generated by the left microphone 16b.

The inventor of the present application obtained by an experiment that, in the case where the first sound signal and the second sound signal are encoded keeping the phase difference between them as it is and then provided to the HMD 100, the user cannot recognize the direction of the sound source, namely, the user is difficult to discriminate whether the sound is heard from the right side or the left side. While, in the experiment, the width of the housing 20 in the horizontal direction was set approximately to the width of the face of an adult human (16 cm), since the sound wave transmission structure of the ears of a human being cannot be reproduced by the microphones 16, the conclusion was obtained that only the phase difference between the first sound signal and the second sound signal is insufficient for a human being to perceive the direction of the sound source.

As means for solving this, it seems recommendable to increase the width of the housing 20 in the horizontal direction, and to increase the phase difference between the first sound signal and the second sound signal. However, in this case, the weight of the housing 20 increases, and it becomes necessary to increase the output power of the motors used in the actuator apparatus 12. Further, if the width of the housing 20 in the horizontal direction is increased, then since the distance between the right microphone 16a and the left microphone 16b becomes greater than the distance between both ears of a human being, sound signals that provide a feeling different from the feeling when a human being actually hears sound are acquired.

Therefore, the inventor of the present application has figured out to solve this problem by amplifying the phase difference between the first sound signal and the second sound signal. The sound processing unit 82 has a function for amplifying the phase difference between the first sound signal generated by the right microphone 16a and the second sound signal generated by the left microphone 16b as hereinafter described. It is to be noted that, since it is necessary for the robot 10 to transmit microphone sound on the real time basis to the HMD 100, the sound processing unit 82 implements the phase difference amplification function by a hardware circuit.

Figure 11:
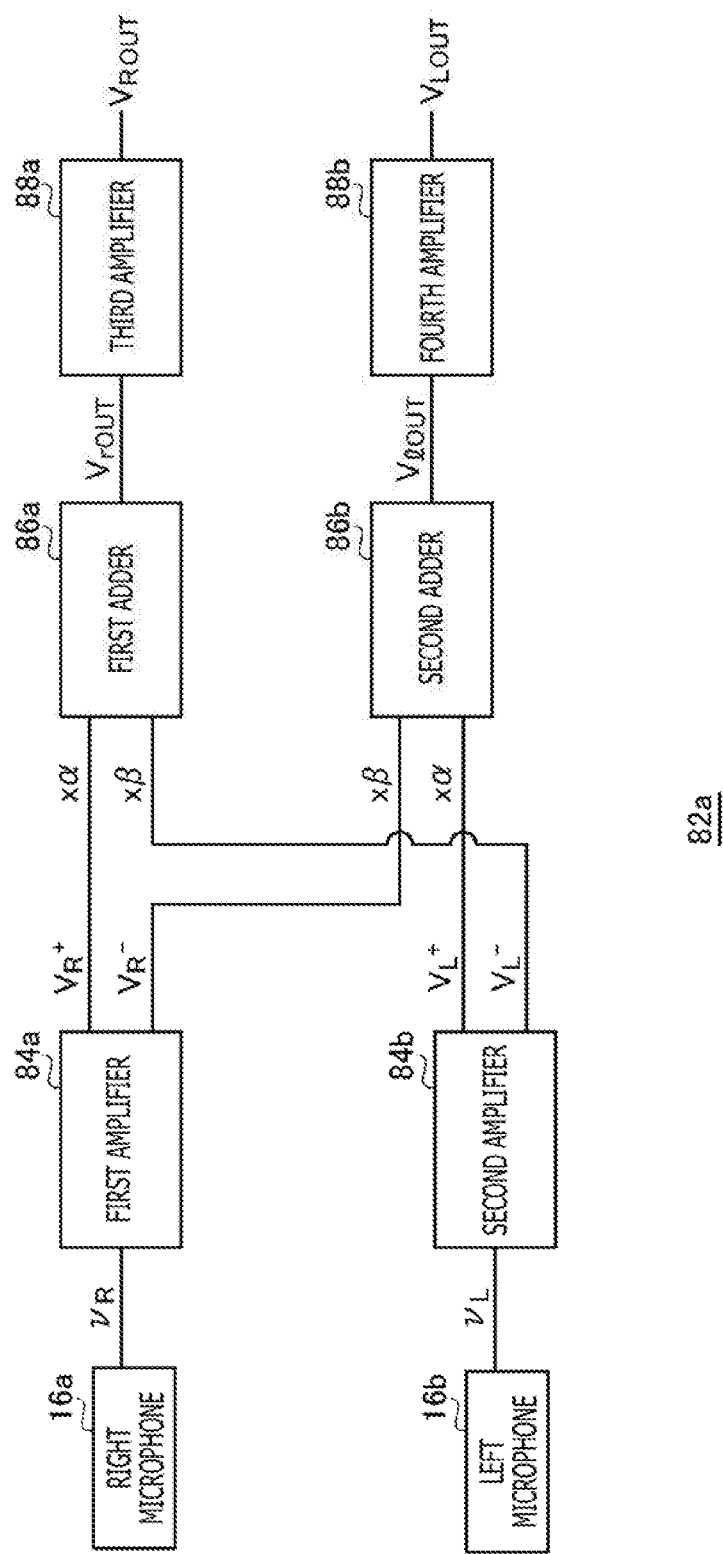
FIG. 11 is a view depicting a circuit configuration of a phase difference amplification apparatus provided in a sound processing unit.

FIG. 11 depicts a circuit configuration of a phase difference amplification apparatus 82a provided in the sound processing unit 82. The phase difference amplification apparatus 82a is an analog circuit apparatus that amplifies and outputs the phase difference between a first sound signal $v_R$ generated by the right microphone 16a and a second sound signal $v_L$ generated by the left microphone 16b.

If the first sound signal $v_R$ is input from the right microphone 16a, then a first amplifier 84a outputs a first positive phase signal $V_R^+$ obtained by amplifying the first sound signal $v_R$ and a first reverse phase signal $V_R^-$ obtained by inverting and amplifying the first sound signal $v_R$. Although the first amplifier 84a may be configured from an operational amplifier that amplifies and outputs a positive-phase component of an input signal and another operational amplifier that amplifies and outputs a reverse-phase component of the input signal, it may otherwise be configured from an operational amplifier having two output terminals that output a positive-phase component and a reverse-phase component.

Meanwhile, if the second sound signal $v_L$ is input from the left microphone 16b, then a second amplifier 84b outputs a second positive phase signal $V_L^+$ obtained by amplifying the second sound signal $v_L$ and a second reverse phase signal $V_L^-$ obtained by inverting and amplifying the second sound signal $v_L$. Similarly to the first amplifier 84a, the second amplifier 84b may be configured from two operational amplifiers that individually output a positive-phase component and a reverse-phase component or may otherwise be configured from a single operational amplifier that output both a positive-phase component and a reverse-phase component.

The first adder 86a outputs an output signal $V_{rOUT}$ obtained by adding a signal obtained by multiplying the first positive phase signal $V_R^+$ by a first coefficient (by $\alpha$) and another signal obtained by multiplying the second reverse phase signal $V_L^-$ by a second coefficient (by $\beta$). Here, $\alpha$ and $\beta$ indicate values higher than 0 but equal to or lower than 1. It is to be noted that $\alpha$ and $\beta$ are set so as to different from each other, and in this example, $\alpha > \beta$. The output signal $V_{rOUT}$ is represented by the following expression.

$$V_{rOUT} = \alpha \times V_R^+ + \beta \times V_L^-$$

Although the first adder 86a may be an addition circuit that adds an output of a voltage dividing circuit that divides the first positive phase signal $V_R^+$ to ∝ times and an output of another voltage dividing circuit that divides the second reverse phase signal $V_L^-$ to β times, it may otherwise be an operational amplifier that adds a voltage signal obtained by multiplying the first positive phase signal $V_R^+$ by ∝ and another voltage signal obtained by multiplying the second reverse phase signal $V_L^-$ by β.

The second adder 86b outputs a output signal $V_{lOUT}$ obtained by adding a signal obtained by multiplying the second positive phase signal $V_L^+$ by the first coefficient (by ∝) and another signal obtained by multiplying the first reverse phase signal $V_R^-$ by the second coefficient (by β). The output signal $V_{lOUT}$ is represented by the following expression.

$$V_{lOUT} = \alpha \times V_L^+ + \beta \times V_R^-$$

Although the second adder 86b may be an addition circuit that adds an output of a voltage dividing circuit that divides the second positive phase signal $V_L^+$ to ∝ times and an output of another voltage dividing circuit that divides the first reverse phase signal $V_R^-$ to β times, it may otherwise be an operational amplifier that adds a voltage signal obtained by multiplying the second positive phase signal $V_L^+$ by ∝ and another voltage signal obtained by multiplying the first reverse phase signal $V_R^-$ by β.

A third amplifier 88a multiplies the output signal $V_{rOUT}$ of the first adder 86a by a third coefficient (by γ) and outputs $V_{ROUT}$, and a fourth amplifier 88b multiplies the output signal $V_{lOUT}$ of the second adder 86b by the third coefficient (by γ) and outputs $V_{LOUT}$. In the sound processing unit 82, the output signals $V_{ROUT}$ and $V_{LOUT}$ from the phase difference amplification apparatus 82a are individually speech coded and transmitted as right ear sound data and left ear sound data from the transmission unit 90 to the HMD 100.

Figure 12:
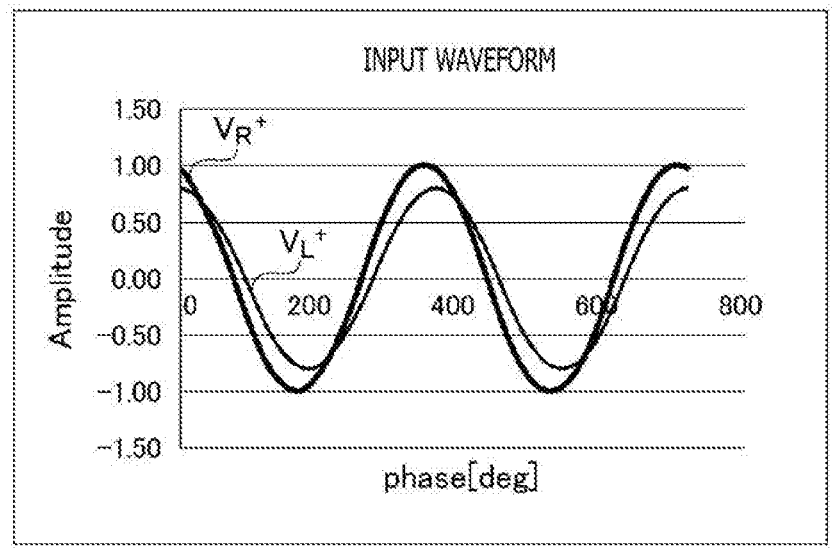
FIG. 12 depicts views illustrating a phase difference between signal waveforms.
Figure 12:
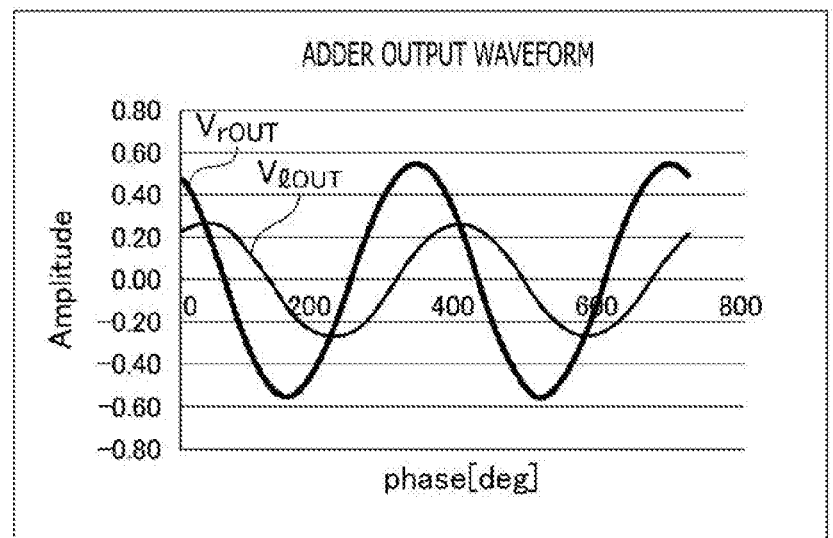

FIG. 12 depicts views illustrating a phase difference between signal waveforms. FIG. 12(a) depicts a relationship in waveform between the first sound signal $v_R$ generated by the right microphone 16a and the second sound signal $v_L$ generated by the left microphone 16b. Here, for the convenience of description, a relationship between the first positive phase signal $V_R^+$ and the second positive phase signal $V_L^+$ obtained by amplifying the first sound signal $v_R$ and the second sound signal $v_L$, respectively, to an equal number of times. In the input waveforms, the sound source is disposed on the right side as viewed from the housing 20 of the robot 10, and the phase of the first positive phase signal $V_R^+$ is advanced a little from that of the second positive phase signal $V_L^+$ and the amplitude is higher with the first positive phase signal $V_R^+$.

FIG. 12(b) depicts a relationship in waveform between the output signal $V_{rOUT}$ of the first adder 86a and the output signal $V_{lOUT}$ of the second adder 86b. If the phase difference between them is compared with the phase difference between the input waveforms depicted in FIG. 12(a), then it is recognized that the phase difference between the output waveforms of the adders depicted in FIG. 12(b) is increased (amplified).

Figure 13:
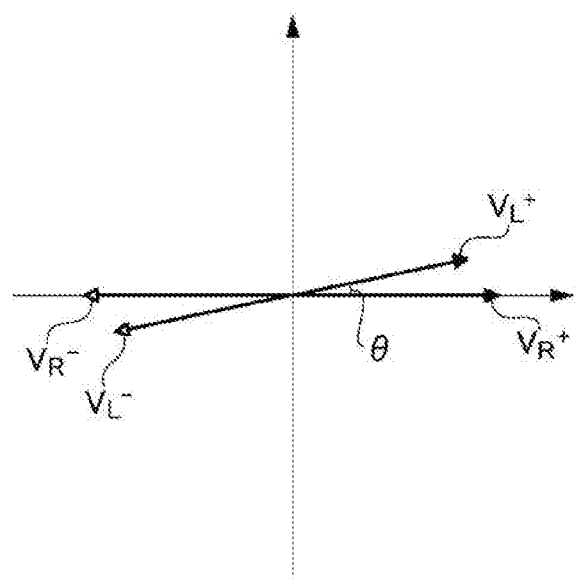
FIG. 13 depicts views illustrating a principle of amplifying a phase difference between input signal waveforms.
Figure 13:
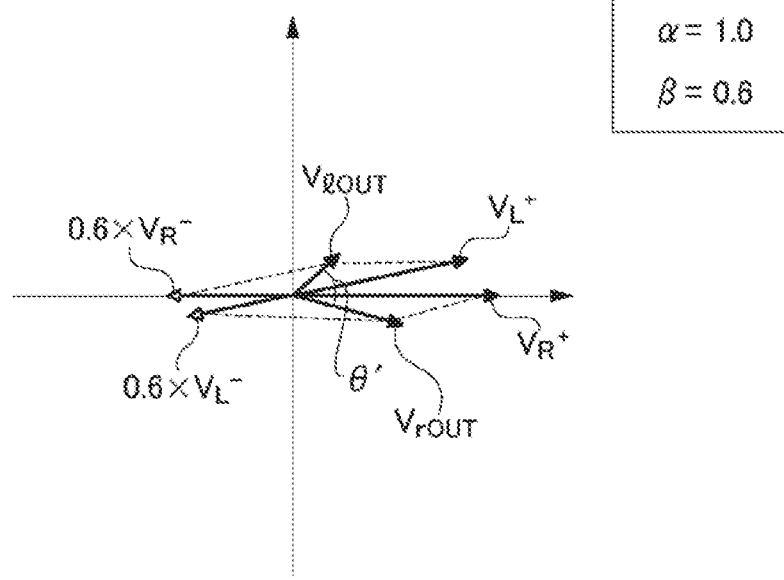

FIG. 13 depicts views illustrating a principle in amplifying a phase difference between input signal waveforms. FIG. 13(a) represents the first positive phase signal $V_R^+$ and the first reverse phase signal $V_R^-$, and the second positive phase signal $V_L^+$ and the second reverse phase signal $V_L^-$ in a two-dimensional coordinate system. The phase difference between the first positive phase signal $V_R^+$ and the second positive phase signal $V_L^+$ is θ.

FIG. 13(b) depicts the output signal $V_{rOUT}$ of the first adder 86a and the output signal $V_{lOUT}$ of the second adder 86b. As described hereinabove, $V_{rOUT}$ and $V_{lOUT}$ are represented by the following expression.

$$V_{rOUT} = \alpha \times V_R^+ + \beta \times V_L^-$$

$$V_{lOUT} = \alpha \times V_L^+ + \beta \times V_R^-$$

In FIG. 13(b), ∝=1.0 and β=0.6 are set.

As depicted in FIG. 13(b), the phase difference between $V_{rOUT}$ and $V_{lOUT}$ becomes θ' and is greater than the phase difference θ depicted in FIG. 13(a). In this manner, the phase difference amplification apparatus 82a amplifies the phase difference between two input sound signals.

As a result of a simulation by the inventor of the present application, it has been found that, when the phase difference between the input signals is 15 degrees, the phase difference between the output signals becomes four times, namely, 60 degrees; when the phase difference between the input signals is 30 degrees, the phase difference between the output signals becomes three times, namely, 90 degrees; and when the phase difference between the input signals is 45 degrees, the phase difference between the output signals becomes approximately 2.7 times, namely, 120 degrees.

According to this simulation result, as the phase difference decreases, the amplification factor increases. In the actual housing 20, the phase difference between the input signals is approximately 5 to 20 degrees, and since the amplification factor can be made great within this range, the phase difference amplification apparatus 82a can increase the phase difference between the output signals to such a degree that the user can distinguish the direction of the sound source. The output signals $V_{ROUT}$ and $V_{LOUT}$ from the phase difference amplification apparatus 82a are individually speech coded and transmitted as right ear sound data and left eye sound data from the transmission unit 90 to the HMD 100.

In the HMD 100, the right ear sound data is output as sound from the earphone 104 for the right ear, and the left ear sound data is output as sound from the earphone 104 for the left ear. The user A would recognize the direction of the sound source by hearing the sounds, between which the phase difference is amplified, by both ears. If the user A feels that the voice is coming from the right side, then the user A would turn the face to the right side. At this time, since the housing 20 of the robot 10 is directed to the right side in an interlocking relationship with the motion of the face of the user A (refer to FIG. 2), the cameras 14 of the robot 10 pick up an image of the environment on the right side and transmit the picked up image data on the real time basis to the HMD 100. Consequently, the user A can talk while looking at the face of the uttering person, and an unprecedented superior user interface can be implemented.

It is to be noted that, while, in the example described above, ∝ and β are set to ∝=1.0 and β=0.6, respectively, the values of ∝ and β are preferably set appropriately by an experiment. As depicted in FIG. 5, the right microphone 16a and the left microphone 16b are provided at positions at which the side faces of the housing 20 are depressed and which are positions on the farther side as viewed from the front face. Since the transmission structure of sound waves in the microphones 16 depends upon the shape of the side faces of the housing, the ratio of ∝ and β is preferably determined optimally by an experiment.

It is to be noted that, in FIG. 5, the microphones 16 are disposed on the inner side in the horizontal direction of a rear plate 17. This is because it is intended to provide a role for making the frequency characteristic different between a sound wave from the front and a sound wave from the rear to reduce high frequency components from the rear. In particular, the rear plate 17 has such a function as an auricle of a person with respect to the microphones 16 such that sound waves from the rear wrap around the rear plate 17 to reach the microphones 16. It is to be noted that, in order to make the frequency characteristics of sound waves from the front and sound waves from the rear different from each other, the rear plate 17 may further be formed so as to be expanded in the upward and downward direction and the horizontal direction. By forming such a sound wave blocking member like the rear plate 17 behind the microphones 16, also it becomes possible for the user A to distinguish the position of the sound source in the forward and rearward direction.

In this manner, in the information processing system 1, the user A can take communication freely with people around the robot 10 on the real time basis using the robot 10 that is an avatar of the user A itself. In the following, a technology for further enhancing the availability of the information processing system 1 is proposed.

In the past, a technology of stitching (sewing) images picked up while successively changing the tilt of a camera to generate a whole sphere panorama image has been known. Recently, also pan/tilt cameras for exclusive use are sold, and even an individual can pick up a whole sphere panorama image.

In the information processing system 1, the robot 10 picks up an image of surroundings directing the cameras 14 to a gaze direction according to a motion of the head of the user A. Where the user A faces various directions, the cameras 14 pick up an image in various directions. By adding a three-dimensional vector representative of a gaze direction to each picked up image, it is possible to generate a virtual whole sphere panorama image.

Figure 14:
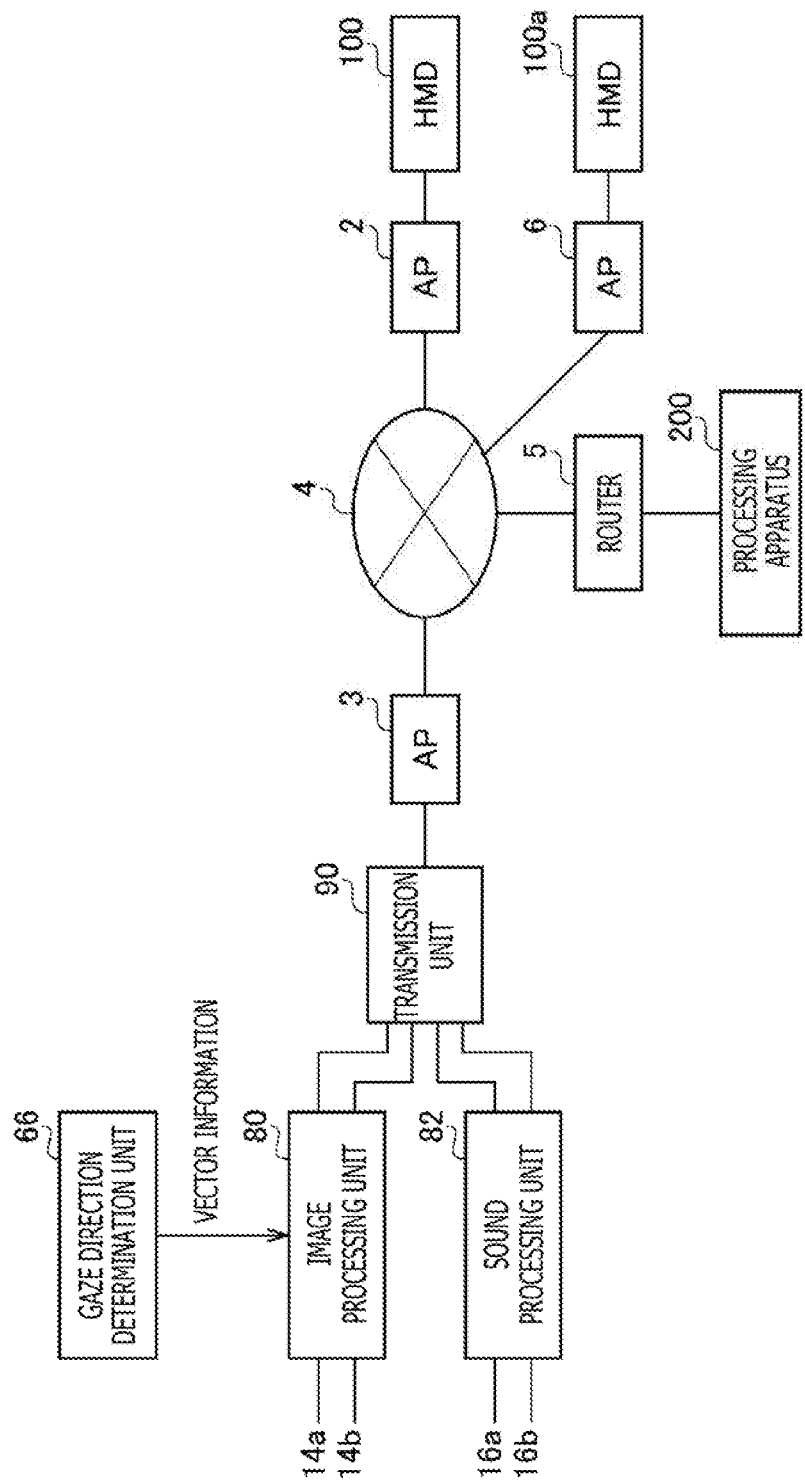
FIG. 14 is a view depicting functional blocks of the robot for implementing an applied technology.

FIG. 14 depicts a modification to the functional blocks of the robot 10. The functional blocks in the modification assume the functional blocks depicted in FIG. 10 and indicate that a determined gaze direction is supplied from the gaze direction determination unit 66 to the image processing unit 80 in the functional blocks.

During use of the robot 10 by the user A, the transmission unit 90 transmits image data for both eyes and sound data for both ears (in the following, they are sometimes referred to collectively as "viewing data") to the HMD 100 of the user A through the network 4. At this time, the transmission unit 90 transmits the same viewing data also to a processing apparatus 200 through a router 5 via the network 4, and the processing apparatus 200 records the viewing data of the user A.

The processing apparatus 200 has a function for generating, while recording the viewing data of the user A, a whole sphere panorama image on the real time basis on the basis of the image data of the user A and providing an image according to the gaze direction of a user B different from the user A to an HMD 100a of the user B. It is to be noted that the HMD 100a has a configuration same as that of the HMD 100 described hereinabove. Although the processing apparatus 200 may be configured, for example, from a single server, it may otherwise be configured from a server group that provides cloud services.

In order to make it possible for the processing apparatus 200 to generate a whole sphere panorama image, the image processing unit 80 adds, to each frame image data, vector information indicative of a gaze direction supplied from the gaze direction determination unit 66 and image pickup time information indicative of an elapsed time period from the start point of image pickup. The vector information indicates the gaze direction of the cameras 14 of the robot 10. The image pickup time information may be any information if it can represent time from the start point of image pickup and may be, for example, a frame number indicative of an order number of image pickup.

According to this technology, during use of the robot 10 by the user A, the user B would wear the HMD 100a, and image data and sound data generated on the basis of viewing data of the user A supplied from the robot 10 are provided to the HMD 100a. If the received viewing data of the user A are merely reproduced as they are, then the processing apparatus 200 may only streaming distribute the received viewing data as they are to the HMD 100a of the user B. However, according to this technology, the processing apparatus 200 can re-construct an image based on the gaze direction of the user B from the whole sphere panorama image configured on the basis of the image data of the user A and provide the image to the HMD 100a of the user B. It is to be noted that the sound data are streaming distributed to the HMD 100a of the user B.

Figure 15:
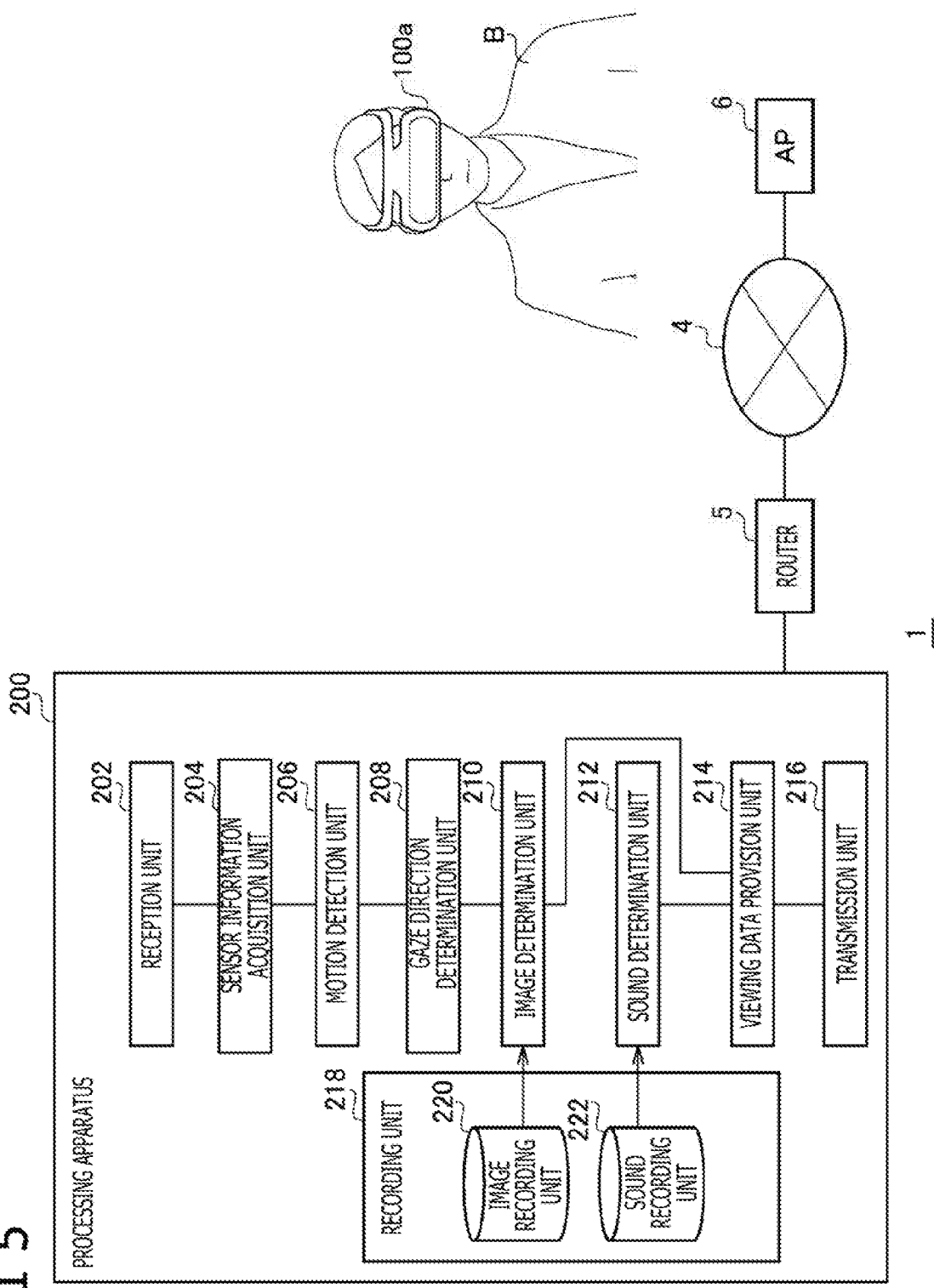
FIG. 15 is a view depicting functional blocks of a processing apparatus.

FIG. 15 depicts functional blocks of the processing apparatus 200. The processing apparatus 200 includes a reception unit 202, a sensor information acquisition unit 204, a motion detection unit 206, a gaze direction determination unit 208, an image determination unit 210, a sound determination unit 212, a viewing data provision unit 214, a transmission unit 216, and a recording unit 218. The recording unit 218 includes an image recording unit 220 and a sound recording unit 222. If the reception unit 202 receives viewing data transmitted from the robot 10, then the image recording unit 220 successively records the received image data, and the sound recording unit 222 successively records the received sound data. It is to be noted that the image data have vector information and image pickup time information upon image pickup for each frame image.

The user B would transmit a reproduction instruction of the viewing data of the user A to the processing apparatus 200 through the HMD 100a. When the processing apparatus 200 accepts the reproduction instruction, it starts a reproduction process of the viewing data. The sound determination unit 212 determines sound data to be provided to the user B, and immediately reads out the sound data recorded in the sound recording unit 222 from the sound recording unit 222 and provides the sound data to the viewing data provision unit 214. In short, the sound determination unit 212 streaming distributes the sound data provided from the robot 10 to the HMD 100a. Accordingly, the user B can hear sound same as the sound, which is being heard by the user A, from the earphone 104 of the HMD 100a.

During a reproduction process by the processing apparatus 200, the reception unit 202 receives sensor information transmitted from the HMD 100a the user B wears, and the sensor information acquisition unit 204 acquires the received sensor information. This sensor information is posture information of the posture of the HMD 100a detected by the posture sensor 124. The motion detection unit 206 detects the posture of the HMD 100a worn on the head of the user B. The gaze direction determination unit 208 determines a gaze direction of a virtual camera in the whole sphere panorama image in response to the posture of the HMD 100a detected by the motion detection unit 206. The image determination unit 210 determines image data to be provided to the user B and synthesizes an image picked up by the virtual camera directed in the determined gaze direction using a plurality of image data recorded in the image recording unit 220 to generate image data.

The viewing data provision unit 214 provides viewing data including the image data determined by the image determination unit 210 and the sound data determined by the sound determination unit 212 from the transmission unit 216 to the HMD 100a of the user B.

The components indicated as functional blocks that perform various processes in FIG. 15 can be configured, in hardware, circuit blocks, a memory, and other LSIs and are implemented in software from a program load in the memory and so forth. Accordingly, it is recognized by those skilled in the art that the functional blocks can be implemented in various forms only from hardware, only from software, or from a combination of hardware and software, and they are not restricted to any of them.

The processing apparatus 200 generates an omnidirectional panorama image. Accordingly, if the user B turns the head to the left or the right to turn the line of sight in the horizontal direction to the left or the right, then a panorama image in the left direction or the right direction is displayed on the display panel 102 of the HMD 100a. Further, if the user B tilts the head upwardly or downwardly to tilt the line of sight in the vertical direction, then a panorama image in the upward direction or the downward direction is displayed on the display panel 102 of the HMD 100a.

Figure 16:
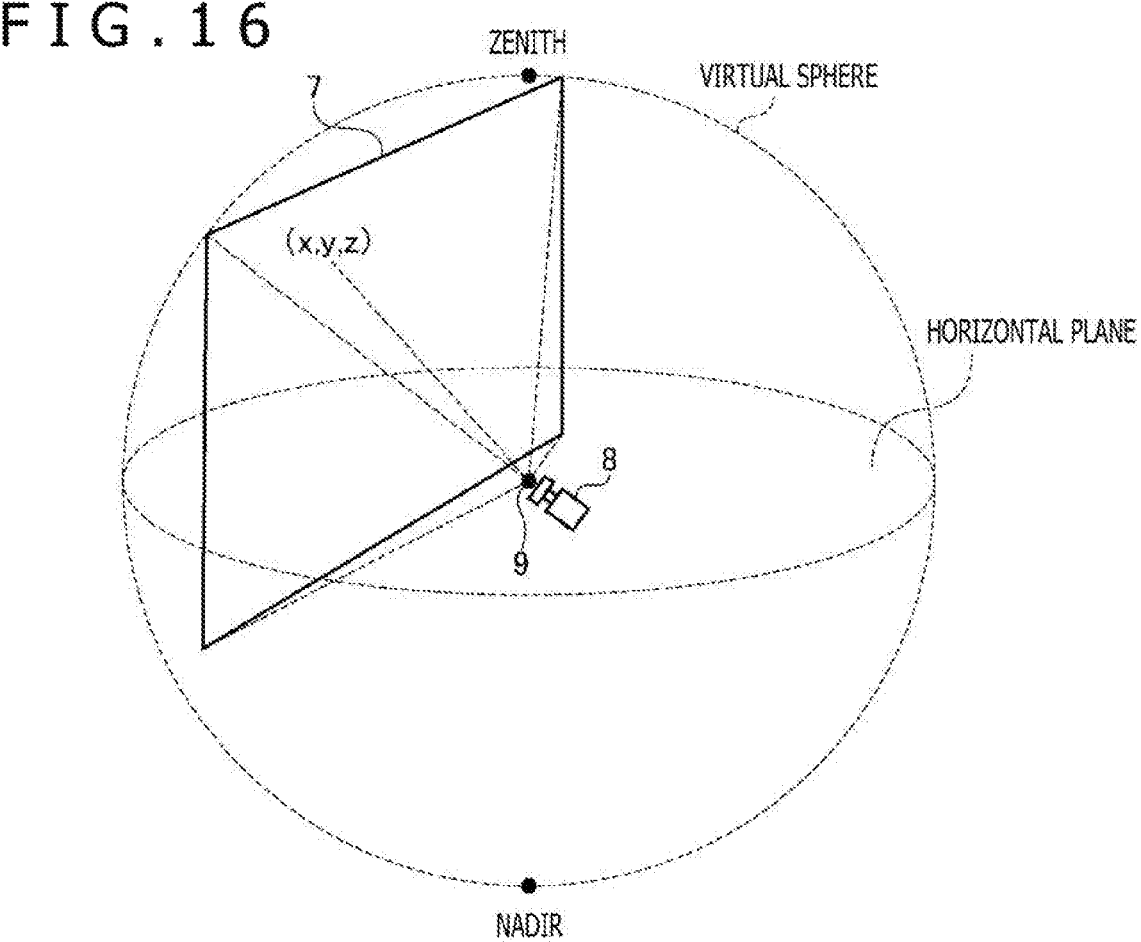
FIG. 16 is a view illustrating a whole sphere panorama image.

FIG. 16 is a view illustrating a whole sphere panorama image generated by the processing apparatus 200. According to this technology, a virtual environment is implemented in which an image to be viewed is changed when the user B positioned at the center of a sphere changes the direction of its line of sight. The image determination unit 210 stitches (sews) image data recorded in the image recording unit 220 to generate a whole sphere panorama image.

In the embodiment, in order to simplify the description, the robot 10 does not perform zooming of the cameras 14 and acquires image data under a fixed magnification ratio. Therefore, the image determination unit 210 pastes the image data to the inner circumferential face of the whole sphere on the basis of the vector information added to the image data thereby to configure a whole sphere panorama image. It is to be noted that a region in which a plurality of image data overlap with each other is overwritten with the latest image data, and a whole sphere panorama image close to a real time situation can be configured thereby.

It is to be noted that the actual image generation process of the image determination unit 210 is a process not for always configuring a whole sphere panorama image but for dynamically generating a frame image 7 picked up from a center point 9 at which the user B is positioned in order to reduce the processing load. At this time, the image determination unit 210 preferably sets the image pickup range (angle of view) of a virtual camera 8 so as to correspond to the actual image pickup range (angle of view) of the cameras 14 of the robot 10. This makes it possible for the user B to see, at a timing at which the gaze direction of the user A and the gaze direction of the user B coincide with each other, an image same as that viewed by the user A.

In this manner, the image determination unit 210 carries out an image stitching process using vector information set as metadata in image data to generate a frame image 7 within an image pickup range determined from the gaze direction of the user B. The motion detection unit 206 performs a head tracking process for the user B to detect a rotational angle and a tilt of the head of the user B (actually, the HMD 100a). Here, the rotational angle of the HMD 100a is a rotational angle with respect to a reference direction of a horizontal plane, and the reference direction may be set, for example, as a direction in which the HMD 100a is directed when the power supply to the HMD 100a is turned on. Meanwhile, the tilt of the HMD 100a is a tilt angle with respect to the horizontal plane. For the head tracking process, a known technology may be utilized, and the motion detection unit 206 detects the rotational angle and the tilt of the HMD 100a from sensor information detected by the posture sensor of the HMD 100a.

The gaze direction determination unit 208 determines a posture of the virtual camera 8 in a virtual sphere in accordance with the detected rotational angle and tilt of the HMD 100a. The virtual camera 8 is disposed such that it picks up an image of the inner circumferential face of the virtual sphere from the center point 9 of the virtual sphere, and the gaze direction determination unit 208 may determine the direction of the optical axis of the virtual camera 8 so as to coincide with the optical axis direction of the cameras 14 of the robot 10.

It has been described that, in the robot 10, after the gaze direction determination unit 66 determines the gaze direction of the HMD 100 of the user A as a vector (x, y, z) of a three-dimensional coordinate system, it may determine the gaze direction of the cameras 14 of the robot 10 as same (x, y, z). Also in the processing apparatus 200, if the gaze direction determination unit 208 determines the gaze direction of the HMD 100a of the user B as a vector (x, y, z) of a three-dimensional coordinate system, then it may determine the gaze direction of the virtual camera 8 as the same vector (x, y, z). Further, in the case where the gaze direction determination unit 66 corrects the gaze direction of the HMD 100 by a predetermined conversion expression to determine the gaze direction of the cameras 14, also the gaze direction determination unit 208 may correct the gaze direction of the HMD 100a by the same conversion expression to determine the gaze direction of the virtual camera 8. By handling the individual three-dimensional coordinate systems in this manner, at a timing at which the gaze direction of the user A and the gaze direction of the user B coincide with each other, the user B can see an image same as that seen by the user A.

After the frame image 7 of the virtual camera 8 is generated, the image determination unit 210 carries out optical distortion correction for the optical lens and supplies the image data to the viewing data provision unit 214. It is to be noted that, although one virtual camera 8 is depicted in FIG. 16, actually two virtual cameras 8 for the left eye and the right eye are disposed, and image data of them are generated on the basis of left eye image data and right eye image data provided from the robot 10, respectively.

Figure 17:
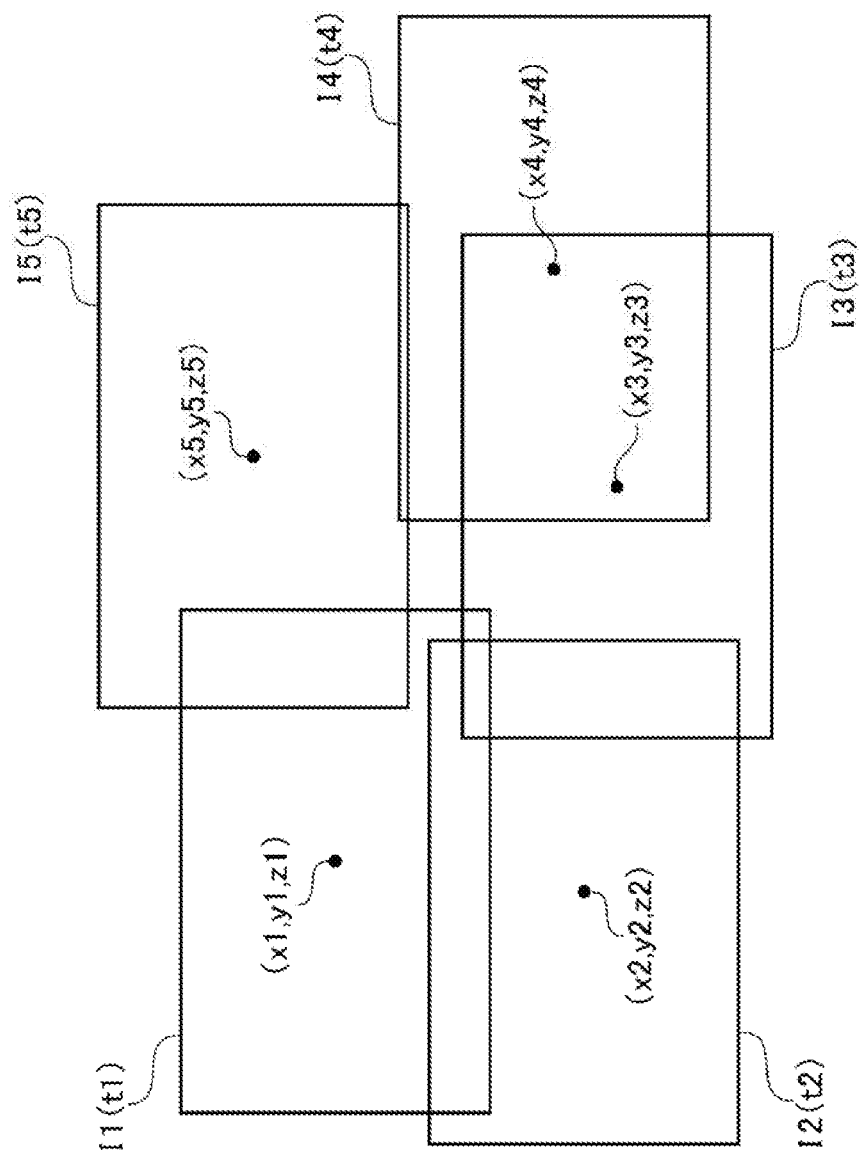
FIG. 17 is a view illustrating picked up image data recorded in an image recording unit.

FIG. 17 is a view illustrating picked up image data recorded in the image recording unit 220. Here, for the convenience of description, a plurality of image data for one eye are depicted, and image data for which affine transformation is carried out in regard to the gaze direction of the user B are disposed on a two-dimensional plane. It is to be noted that the gaze direction of the user B is hereinafter described.

The image determination unit 210 has a function of joining overlapping portions of picked up images together to generate a whole sphere panorama image. For the technology for joining picked up images together, a known technology may be utilized as described, for example, in Japanese Patent No. 5865388 by the same applicant. In the following, a method for selecting picked up image data from among a plurality of picked up image data recorded in the image recording unit 220 is described.

In FIG. 17, five image data I1 to I5 are depicted. (x, y, z) included in each image data represents a gaze direction (vector information) of the camera 14 upon image pickup, and "t" represents image pickup time information. Here, the image data I1 have vector information (x1, y1, z1) and image pickup time information t1 as additional information. Similarly, the image data I2 have vector information (x2, y2, z2) and image pickup time information t2 as additional information. Similarly, the image data I3 have vector information (x3, y3, z3) and image pickup time information t3 as additional information; the image data I4 have vector information (x4, y4, z4) and image pickup time information t4 as additional information; and the image data I5 have vector information (x5, y5, z5) and image pickup time information t5 as additional information.

It is to be noted that image pickup time information t1 to t5 that is additional information represents elapsed time periods from the image pickup start point (time 0) and has a relationship of t1<t2<t3<t4<t5. Accordingly, among the image data I1 to I5, the image data I1 are picked up first, and the image data I5 are picked up last. The image determination unit 210 selects image data for generating a synthetic image on the basis of the image pickup time information and the gaze direction of the virtual camera 8 determined by the gaze direction determination unit 208.

In particular, the image determination unit 210 determines an image pickup range (angle of view of the virtual camera 8) to be cut from the whole sphere panorama image from the gaze direction of the virtual camera 8 determined by the gaze direction determination unit 208, namely, from a direction in which the user B who wears the HMD 100a is directed, and extracts image data including the image included in the image pickup range on the basis of the vector information added to the image data.

Figure 18:
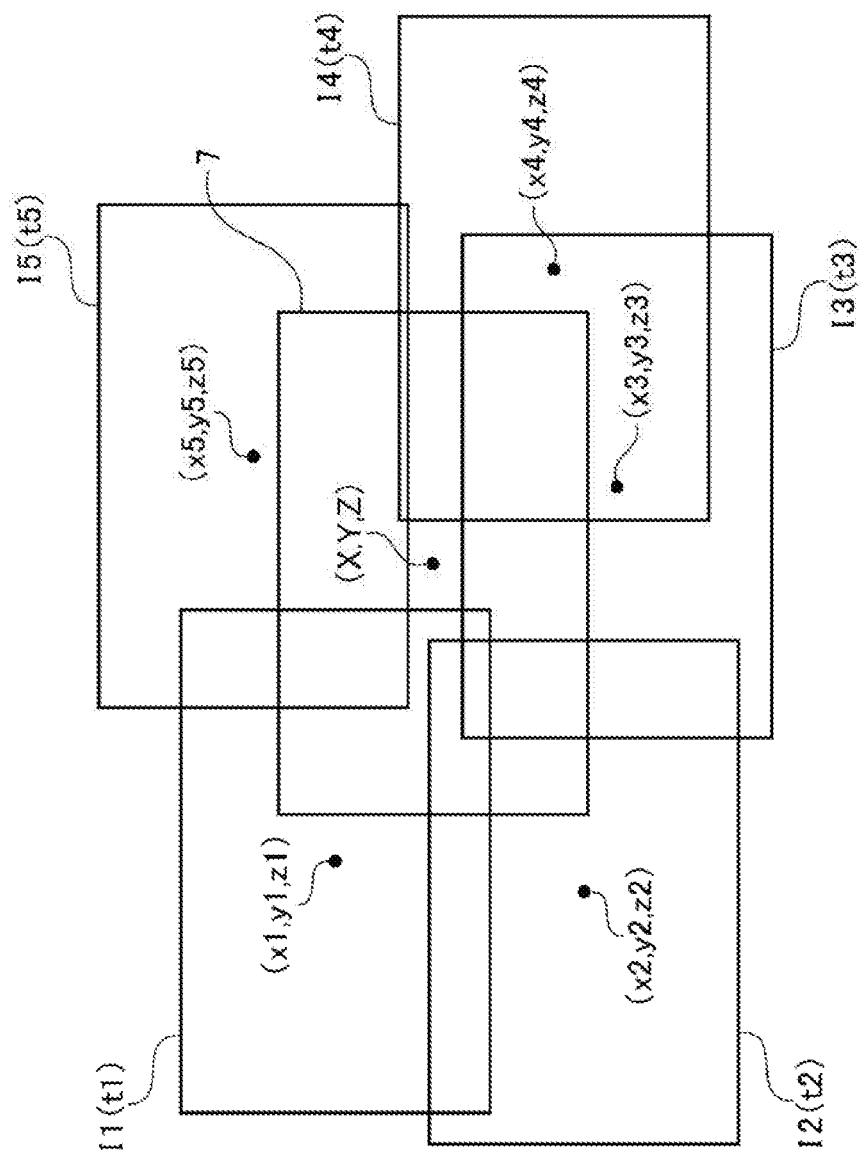
FIG. 18 is a view depicting a relationship between a frame image generated by an image generation unit and image data.

FIG. 18 is a view depicting a relationship between a frame image 7 to be generated by the image determination unit 210 and image data. Referring to FIGS. 17 and 18, the image data I1 to I5 are mapped on a two-dimensional plane orthogonal to the gaze direction (X, Y, Z) of the virtual camera 8 on the basis of the individual vector information, and the position of each of the image data I1 to I5 is defined by four vertex coordinates on the two-dimensional plane. The image determination unit 210 determines the position of the angle of view (image pickup range) of the virtual camera 8 on the whole sphere panorama image and determines the four vertex coordinates of the frame image 7 on the two-dimensional plane orthogonal to the gaze direction from the gaze direction (X, Y, Z) of the virtual camera 8. The image determination unit 210 extracts image data included in the frame image 7 from among the image data recorded in the image recording unit 220. As depicted in FIG. 18, since the image data I1 to I5 include an image included in the frame image 7, they are extracted as image data included in the image pickup range of the virtual camera 8.

The image determination unit 210 generates, for a region in which a plurality of image data overlap with each other, a synthetic image preferentially using image data having late image pickup time information. In the example depicted in FIG. 18, the image data are successively written into the frame image 7 beginning with image data of early image pickup time, namely, beginning with the image data I1 such that they are successively overwritten with newer image data to synthesize the frame image 7.

In this manner, for a region in which a plurality of image data overlap with each other, the image determination unit 210 generates a synthetic image using image data having image pickup time information closer to the current point of time. For example, in the case where a region in which the image data I4 and the image data I5 overlap with each other exists in a region included in the image pickup range, the image data I5 having later image pickup time are filled into the overlapping region. Consequently, a synthetic image can be generated using image data closer to the current point of time, and a synthetic image at time closer to the current point of time can be provided to the user B.

In this image reproduction application, depending upon the direction in which the user B faces, the image data may be insufficient, resulting in difficulty to generate a frame image 7. Especially, immediately after the robot 10 starts image pickup, since the number of image data is small in the first place, it sometimes occurs that the image determination unit 210 cannot generate a frame image 7 according to the gaze direction of the user B. In the case where the user A does not move the HMD 100 at all within an image pickup period, which cannot actually occur, since the vector information of the image data recorded in the image recording unit 220 is quite same, for example, if the user B faces in the just opposite direction to that of the user A, then image data included in the image pickup range of the virtual camera 8 in the gaze direction does not exist.

In such a case as just described, the image determination unit 210 may generate image data by superimposing a message that an image in the gaze direction of the user B cannot be generated on the received image data of the user A and provide the generated image data from the viewing data provision unit 214 to the HMD 100a. For example, in the case where the image in the gaze direction of the user B cannot be synthesized at a ratio equal to or higher than a predetermined ratio (for example, 30%), the image determination unit 210 may not perform generation of a synthetic image and supply the image data viewed by the user A to the viewing data provision unit 214 together with the message described above.

Further, since the image determination unit 210 synthesizes a frame image 7 from a plurality of image data, the generated frame image 7 sometimes becomes a patch image and is degraded in visibility. Therefore, in the case where an image of a predetermined ratio (for example, 50%) within an image pickup range cannot be formed from single image data, the image determination unit 210 may generate image data by superimposing a message that an image in the gaze direction of the user B cannot be generated on the image data of the user A.

In the example described above, it is described that the image determination unit 210 generates a synthetic image preferentially using image data having later image pickup time information, in the case where a predetermined ratio or more of a frame image 7 can be configured by using image data having earlier image pickup time information, such image data having earlier image pickup time information may be used.

Further, as time passes, a variation occurs with the environment whose image is being picked up by the robot 10, and therefore, it may not possibly be preferable to provide a synthetic image, for which image data in the past are used, to the user B. Therefore, the image determination unit 210 may perform an image extraction process such that image data before a predetermined time period or more are not included in the synthetic image.

The foregoing is directed to an example in which the user B utilizes viewing data of the user A on the real time basis. In the following, an applied technology of this is described. In the applied technology, the processing apparatus 200 records viewing data not for the object of real time reproduction of viewing data of the user A but for the object of secondary use of the viewing data.

For the object of secondary use of the viewing data, the image processing unit 80 in the robot 10 adds image pickup time information and vector information to each of the frame image data, and the sound processing unit 82 adds recording time information indicative of an elapsed time period from the recording start point to the sound data. It is to be noted that, since image pickup (recording) by the cameras 14 and sound recording through the microphones 16 are started at the same timing, the image pickup start point and the sound recording start point indicate the same timing. The image pickup time information and the sound recording time information may be time information generated by a clock generation unit of the robot 10. The form in which image data and sound data are added to additional information may be any form and may be a form in which the processing apparatus 200 can refer to them when it generates viewing data for reproduction.

In this applied technology, after the user A ends use of the robot 10, a different user B (who may be the user A) would wear the HMD 100a and image data and sound data generated on the basis of the viewing data of the user A recorded in the processing apparatus 200 are provided to the HMD 100a. At this time, as described in connection with the embodiment, the processing apparatus 200 configures a whole sphere panorama image on the basis of the viewing data of the user A and re-constructs an image on the basis of the gaze direction of the user B from the whole sphere panorama image such that the image can be provided to the HMD 100a of the user B. In this utilization environment, the robot 10 is not used.

Referring to FIG. 15, the image recording unit 220 records image data transmitted from the robot 10 and the sound recording unit 222 records sound data transmitted from the robot 10. In this applied technology, the image recording unit 220 and the sound recording unit 222 are in a state in which all of the viewing data transmitted from the robot 10 to the user A are recorded already. It is to be noted that the image data have image pickup time information and vector information upon image pickup added thereto, and the sound data have recording time information added thereto.

The user B would issue a reproduction instruction of the viewing data of the user A to the processing apparatus 200 through the HMD 100a. When the processing apparatus 200 accepts the reproduction instruction, it starts a reproduction process of the viewing data. It is to be noted that, in the case where the recording unit 218 has viewing data for one hour recorded therein, the user B may start reproduction from an arbitrary point of time within the range of one hour. In this case, the reception unit 202 accepts a time designation from the user B and provides the time designation to the image determination unit 210 and the sound determination unit 212.

The sound determination unit 212 reads out sound data having recording time information corresponding to reproduction time information indicative of an elapsed time period from the reproduction start point from the sound recording unit 222 and provides the sound data to the viewing data provision unit 214. The reproduction start point signifies a reproduction start point of the viewing data, and accordingly, the image pickup start point and the sound recording start point indicate the same timing. The sound determination unit 212 reads out sound data whose sound recording time information coincides with the sound reproduction time information from the sound recording unit 222 and provides the sound data to the viewing data provision unit 214.

During a reproduction process by the processing apparatus 200, the reception unit 202 receives sensor information transmitted from the HMD 100a the user B wears, and the sensor information acquisition unit 204 acquires the received sensor information. This sensor information is posture information indicative of the posture of the HMD 100a detected by the posture sensor 124. The motion detection unit 206 detects the posture of the HMD 100a worn on the head of the user B. The gaze direction determination unit 208 determines a gaze direction of the virtual camera in response to the posture of the HMD 100a detected by the motion detection unit 206. The image determination unit 210 synthesizes an image picked up by the virtual camera directed in the determined gaze direction using a plurality of image data recorded in the image recording unit 220. The viewing data provision unit 214 provides viewing data including the image data synthesized by the image determination unit 210 and the sound data read out by the sound determination unit 212 from the transmission unit 216 to the HMD 100a.

The image determination unit 210 stitches (sews) the image viewed by the user A before the reproduction time of the viewing data by the user B to dynamically generate a frame image 7 picked up from the center point 9 at which the user B is positioned.

The image viewed by the user A before the reproduction time of the viewing data by the user B is described. In the case where image data for one hour from the image pickup start point are recorded in the image recording unit 220, the reproduction time from the reproduction start point by the user B is specified by some timing within one hour. For example, in the case where the reproduction time is the timing at 15 minutes after the reproduction start, images to which image pickup time information within 15 minutes, namely, images picked up before 15 minutes elapse from the image pickup start point, are views viewed by the user A before the reproduction time. In short, if an image at the point of time of 15 minutes from the image pickup start is being reproduced, then the image determination unit 210 generates a frame image 7 using the image data to which the image pickup time information within 15 minutes from the image pickup start is added, and if an image at the point of time of 45 minutes from the reproduction start, then the image determination unit 210 generates a frame image 7 using the image data to which the image pickup time information within 45 minutes from the image pickup start is added.

Referring to FIG. 18, the image determination unit 210 extracts image data to which image pickup time information before the reproduction time information is added but does not extract image data to which image pickup time information after the reproduction time information is added. For example, if the time information for reproduction of a frame image 7 is after time t3 but before time t4, then the image determination unit 210 extracts the image data I1 to I3 but does not extract the image data I4 and I5. By generating a synthetic image using image data to which image pickup time information before the reproduction time information is added in this manner, the image determination unit 210 does not allow the user B to view an image picked up after the reproduction time.

Since the viewing data provision unit 214 is transmitting sound data having recording time information corresponding to reproduction time to the HMD 100a, the user B is hearing sound synchronized with the reproduction time. Therefore, the user B is generally aware of a situation before the reproduction time and can grasp, if the provided image data are synthesized from image data before the reproduction time, what situation is being displayed. However, if the provided image data are synthesized from image data after the reproduction time, then an image of which the user B is not aware is presented to the user B, and it is estimated that the user B is confused. Therefore, the image determination unit 210 does not present an image picked up after the reproduction time to the user B.

It is to be noted that the image determination unit 210 generates a synthetic image using, for a region in which a plurality of image data overlap with each other, image data having image pickup time information close to the reproduction time information. For example, if a region included in the image pickup range includes a region in which the image data I1 and the image data I2 overlap with each other, the image data I2 picked up later than the image data I1 is filled into the overlapping region. Consequently, it becomes possible to synthesize a synthetic image using image data close to the reproduction time information, and an image synthesized from image data closest to the reproduction time can be provided to the user B.

The present invention has been described with reference to the embodiment. The embodiment is exemplary, and it can be recognized by those skilled in the art that various modifications can be made to the components and the processes of the embodiment and that also such modifications are included in the scope of the present invention.

In the description of the embodiment, it is described that the image determination unit 210 carries out an image stitching process to generate a frame image 7 of an image pickup range determined from the gaze direction of the user B. In a modification, without carrying out the image stitching process, the image determination unit 210 determines image data to be provided to the user B on the basis of the gaze direction of the virtual camera 8 and vector information added to image data recorded in the image recording unit 220.

In this modification, the image determination unit 210 determines the image data to which the vector information corresponding to the gaze direction of the virtual camera 8 is added as image data to be provided to the user B. The vector information corresponding to the gaze direction of the virtual camera 8 includes vector information coincident with the gaze direction of the virtual camera 8 and vector information that can be regarded as substantially coincident with the gaze direction of the virtual camera 8. In particular, in the case where the gaze direction of the virtual camera 8 and the vector information are within a predetermined angle (for example, 10 degrees), the image determination unit 210 may decide that the gaze direction of the virtual camera 8 and the vector information substantially coincide with each other.

In the case where viewing data of the user A is to be synchronously reproduced, the image determination unit 210 determines, from among the image data to which vector information corresponding to the gaze direction of the virtual camera 8 is added, image data having the latest image pickup time information as image data to be provided to the user B. This makes it possible to provide an image closest to the current time to the user B.

In the case where image data to which vector information corresponding to the gaze direction of the virtual camera 8 is added is not recorded in the image recording unit 220, the image determination unit 210 may determine image data to which vector information that can be regarded substantially coincident in terms of the (x, y) components other than the component in the heightwise direction (z-axis direction) is added as image data to be provided to the user B. The vector information that can be regarded as coincident is vector information whose (x, y) components are within a range of a predetermined angle (for example, 7 degrees). By checking the approximation only of the (x, y) components, it becomes easy for the image determination unit 210 to find out image data to which vector information corresponding to the gaze direction of the virtual camera 8 is added and avoid such a situation that image data cannot be provided to the user B.

In the case where viewing data of the user A are to be secondarily used, the image determination unit 210 determines image data to be provided to the user B from images viewed by the user A before the reproduction time of the viewing data by the user B. In short, the image determination unit 210 determines, from among the image data to which image pickup time information before the reproduction time information is added, image data to which vector information corresponding to the gaze direction of the virtual camera 8 is added. At this time, if a plurality of image data are available, then the image determination unit 210 preferably selects image data having image pickup time information close to the reproduction time information.

It is to be noted that a case in which image data when the user A turns the head in the horizontal direction are recorded in the image recording unit 220 is examined. If the user B turns the head in the opposite direction to that of the user A with a slight delay from the user A, then such a situation that the image viewed by the user A is reversely reproduced on the HMD 100a may possibly occur. In this case, the time series of the image data is reversed, and there is the possibility that this may provide incompatibility. Therefore, in the case where, when the user B continuously changes the gaze direction, image data of the user A come to be reproduced reversely, the image determination unit 210 may fix the image data such that image data to be provided are not changed.

In order to increase utility of the information processing system 1, the robot 10 may further include an input sensor for accepting an input from the outside such as a tactile sensor or a vibration sensor. In the functional blocks depicted in FIG. 10, the input sensor is provided in the output system 24, and sensor information of the input sensor is transmitted from the transmission unit 90 to the HMD 100. The HMD 100 may include outputting means for outputting sensor information such that sensor information is converted into and transmitted as vibration to the user A.

Further, while it is described that, in the information processing system 1, the robot 10 causes the housing 20 to interlock with a motion of the head of the user A, the robot 10 may further include means for transmitting a state of the user A such as facial expressions. For example, the HMD 100 includes a sensor for detecting a motion of the eyes or the eyebrows of the user A who wears the HMD 100, means for analyzing the tone of voice and so forth. The motion of the eyes or the eyebrows represents a facial expression or an emotion of the user, and the tone of voice represents a psychological state or an emotion of the user. The state information relating to the motion of the eyes or the eyebrows and/or the tone of voice is transmitted from the HMD 100 to the robot 10, and the robot 10 may drive a facial expression unit provided in the housing 20 to reproduce a facial expression or an emotion of the user A. The facial expression unit may be a movable member (for example, a member that simulates the shape of an eyebrow) formed at an upper portion of each camera 14 on the front face of the housing 20, and the movable member is driven on the basis of information transmitted from the HMD 100. It is to be noted that the protective cover 19 attached for pivotal motion at an upper portion of the cameras 14 may be utilized as a facial expression unit simulating an eyebrow of a human being, or a motor for moving the protective cover 19 may be provided in the housing 20 to move the protective cover 19. Alternatively, the facial expression unit may be a display that represents a facial expression or a psychological state of the user A using a color such that a facial expression or an emotion of the user A may be represented by changing the display color.

In the following, the movable member provided on the robot 10 is described. As described hereinabove, the movable member is provided in order to create a facial expression of the robot 10. Although the movable member may be controlled in operation such that it represents a facial expression or an emotion of the user A who wears the HMD 100, it may otherwise be controlled in operation on the basis of the posture of the housing 20. Since the robot 10 not only moves the housing 20 but also moves the movable member attached to the housing 20, it provides such a feeling to a person around the robot 10 that the robot 10 is the user A.

As described so far, the housing 20 can be changed in posture by the actuator apparatus 12 and the actuator apparatus 12 causes the posture of the housing 20 to interlock with the motion of the HMD 100 worn by the user A. The housing 20 and the actuator apparatus 12 configure the robot 10, and the housing 20 configures the face of the robot 10. Here, "to configure the face of the robot" signifies to form the housing 20 such that, when a person around the robot 10 sees the robot 10, it can recognize that the housing 20 is the face. The point in recognition that the housing 20 is the face is that the housing 20 includes the cameras 14 positioned at an uppermost portion of the robot 10 and corresponds to an eye of a human being and that the posture of the housing 20 interlocks with the motion of the head of the user, and the housing 20 is recognized as the face of the robot 10 through the points.

Figure 19:
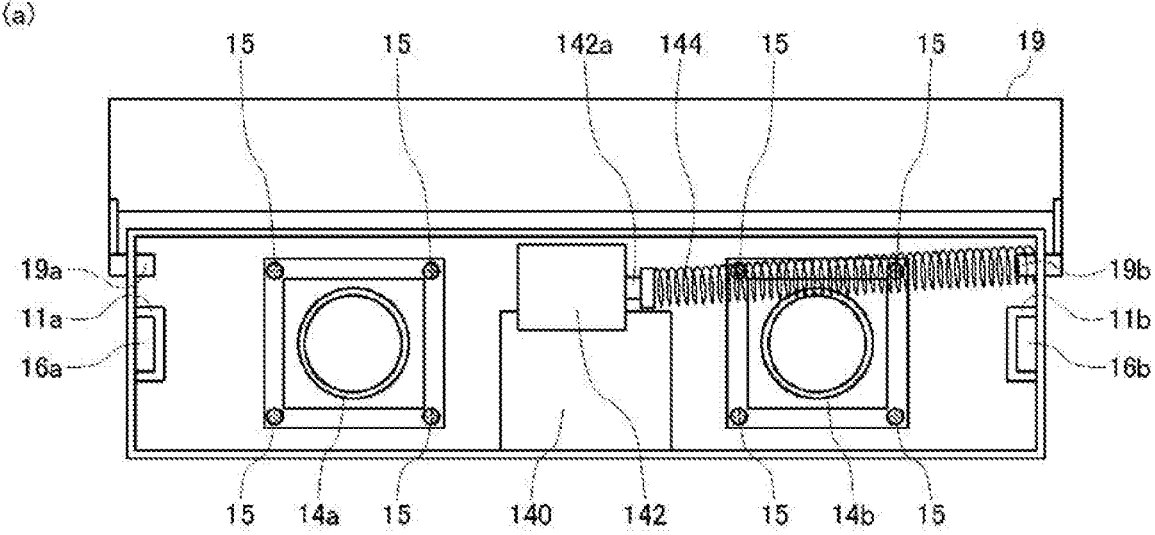
FIG. 19 depicts views illustrating a general structure of the inside of the housing.
Figure 19:
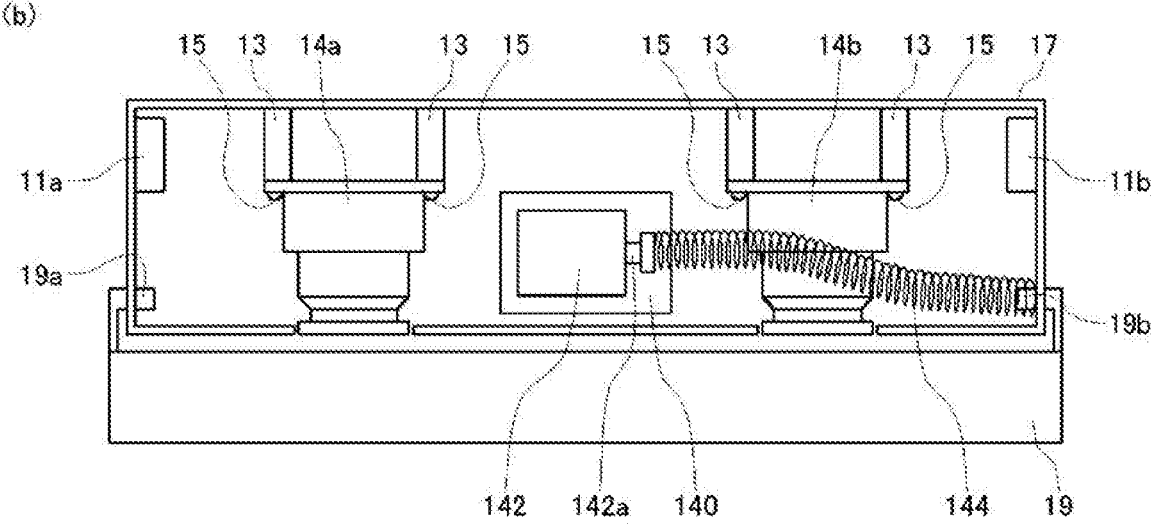

FIG. 19(a) depicts a general structure of the front face of the housing 20, and FIG. 19(b) depicts a general structure of the top face of the housing 20. The housing 20 includes a front plate through which the lens of the cameras 14 is exposed, a bottom plate provided adjacent the front plate and having the insertion member 42 attached thereto, the rear plate 17 provided adjacent the bottom plate and opposing to the front plate, and a top plate provided adjacent the rear plate 17 and the front plate and opposing to the bottom plate. The housing 20 further includes a pair of side plates that close up the opposite end sides of the front plate, bottom plate, rear plate 17, and top plate. It is to be noted that, while, in FIG. 9 and so forth, a manner in which the rear plate 17 projects rearwardly is depicted, since the shape of the rear plate 17 does not particularly have a relationship to the description given below, in FIG. 19(a) and FIG. 19(b), the housing 20 is depicted in such a manner that it has a parallelepiped elongated in the horizontal direction. It is to be noted that the front face general structure of FIG. 19(a) depicts a state in which the front plate is removed, and FIG. 19(b) depicts a state in which the top plate is removed, and depiction of the speaker 18 and depiction of wiring lines including power lines and control signal lines for the cameras 14, the microphones 16, and a driving motor 142 are omitted.

In the inside of the housing 20, a structure for fixing various parts is provided. Microphone accommodation portions 11a and 11b are provided on an inner wall of the side plates and form spaces for accommodating the right microphone 16a and the left microphone 16b therein, respectively.

The right microphone 16a and the left microphone 16b are inserted in the microphone accommodation portions 11a and 11b from the front and are fixed. The right camera 14a and the left camera 14b are fixed to camera supporting portions 13 provided in a projecting manner toward the front from the inner wall of the rear plate 17 by screws 15. A motor fixing portion 140 is formed between the right camera 14a and the left camera 14b, and the driving motor 142 is fixed to the motor fixing portion 140.

The protective cover 19 that is the movable member is a plate member of a rectangular shape and is supported for movement on the housing 20. The protective cover 19 has pivots 19a and 19b provided in an inwardly projecting manner at the opposite ends thereof in the longitudinal direction. Pivot holes are formed in the proximity of a front end at upper portions of the pair of side plates of the housing 20, and the pivot 19a is inserted in the pivot hole of the right side plate while the pivot 19b is inserted in the pivot hole of the left side plate such that the protective cover 19 is supported for pivotal motion on the housing 20.

At least one of the pivot 19a and the pivot 19b is inserted in the inside of the housing farther than the inner wall of the side plate and is connected to a motor shaft 142a of the driving motor 142 in the inside of the housing. In FIG. 19(a) and FIG. 19(b), both of the pivots 19a and 19b extend to the inner side farther than the inner wall of the side plates of the housing, and the pivot 19b from between the pivots 19a and 19b is fixed to one end of a transmission member 144.

The transmission member 144 is a member for transmitting rotation of the driving motor 142 to the protective cover 19 that is the movable member. The transmission member 144 is fixed at one end thereof to the pivot 19b and at the other end thereof to the motor shaft 142a of the driving motor 142. It is to be noted that, although the other end of the transmission member 144 may be directly coupled to the motor shaft 142a, it may otherwise be fixed to an output power shaft of a speed reduction gear for reducing the speed of motor rotation. The protective cover 19 is connected to the driving motor 142 by the transmission member 144 such that it is moved between the closing position at which it protects the cameras 14 and a different position. While the power supply to the robot 10 is turned off, the protective cover 19 protects the cameras 14, but while the power supply is turned on, the protective cover 19 operates as the facial expression unit to implement effective use of the protective cover 19.

Here, the transmission member 144 is formed as a member that deforms torsionally and elastically. In the present example, the transmission member 144 is a coil spring and delays rotational input power of the motor shaft 142a in time by torsion of the coil spring to output the rotational input to the pivot 19b. It is to be noted that the torsion occurring on the coil spring serves as restoring force, and after a delay from the rotational input of the motor shaft 142a, the coil spring is rotated in the direction in which the torsion is to be eliminated.

Further, the transmission member 144 preferably has bending elasticity in the axial direction. Since various parts are accommodated in the inside of the housing 20 as depicted in FIG. 19(a) and FIG. 19(b), the space in which the driving motor 142 is to be disposed is restricted. Since the transmission member 144 has bending elasticity in the axial direction, even if the motor shaft 142a and the pivot 19b are not positioned on the same axial line, they can be connected to each other in a state in which the transmission member 144 is bent in the axial direction. In FIG. 19(a) and FIG. 19(b), a manner is depicted in which the transmission member 144 couples the motor shaft 142a and the pivot 19b to each other in a bent state such that axial misalignment between the motor shaft 142a and the pivot 19b may be absorbed.

The reason why the transmission member 144 having torsional elasticity is adopted is that it is intended to delay rotation of the pivot 19b from rotation of the motor shaft 142a. Although the driving motor 142 drives the protective cover 19 in response to the posture of the housing 20, emotion information of a user and so forth as hereinafter described, the protective cover 19 becomes like an eyebrow positioned above the eyes (cameras 14) of the face of the robot. If the protective cover 19 performs back and forth movement with flap at a high speed, then this movement causes a surrounding person to feel bewildering, and besides since the motion is different from a motion of the eyebrows of a human being, this is not ideal as a motion of the facial expression unit.

Although rotation of the driving motor 142 is arithmetically operated and controlled by software to perform a filtering process for restricting the speed of rotation to a moderate one, it cannot be avoided that the load upon the arithmetic operation unit becomes heavy. Therefore, by transmitted rotation of the driving motor 142 to the pivot 19b of the protective cover 19 using the transmission member 144 which deforms torsionally and elastically, a high speed motion of the protective cover 19 can be suppressed.

If the torsional rigidity of the transmission member 144 is high, then the transmission response delay to the pivot 19b becomes less likely to occur, and therefore, the torsional rigidity is preferably set low. However, the torsion amount actually occurring with the transmission member 144 relies also upon the weight of the protective cover 19. Therefore, in order to increase the response delay, the weight of the protective cover 19 may be increased. Since coil springs having various characteristics are sold at present, although it is advantageous from the point of view of cost to form the transmission member 144 as a coil spring, for example, the transmission member 144 may be a solid bar-like member formed from a rubber material. By forming the transmission member 144 from a rubber material, the transmission member 144 can be provided with torsional elasticity and bending elasticity.

Figure 20:
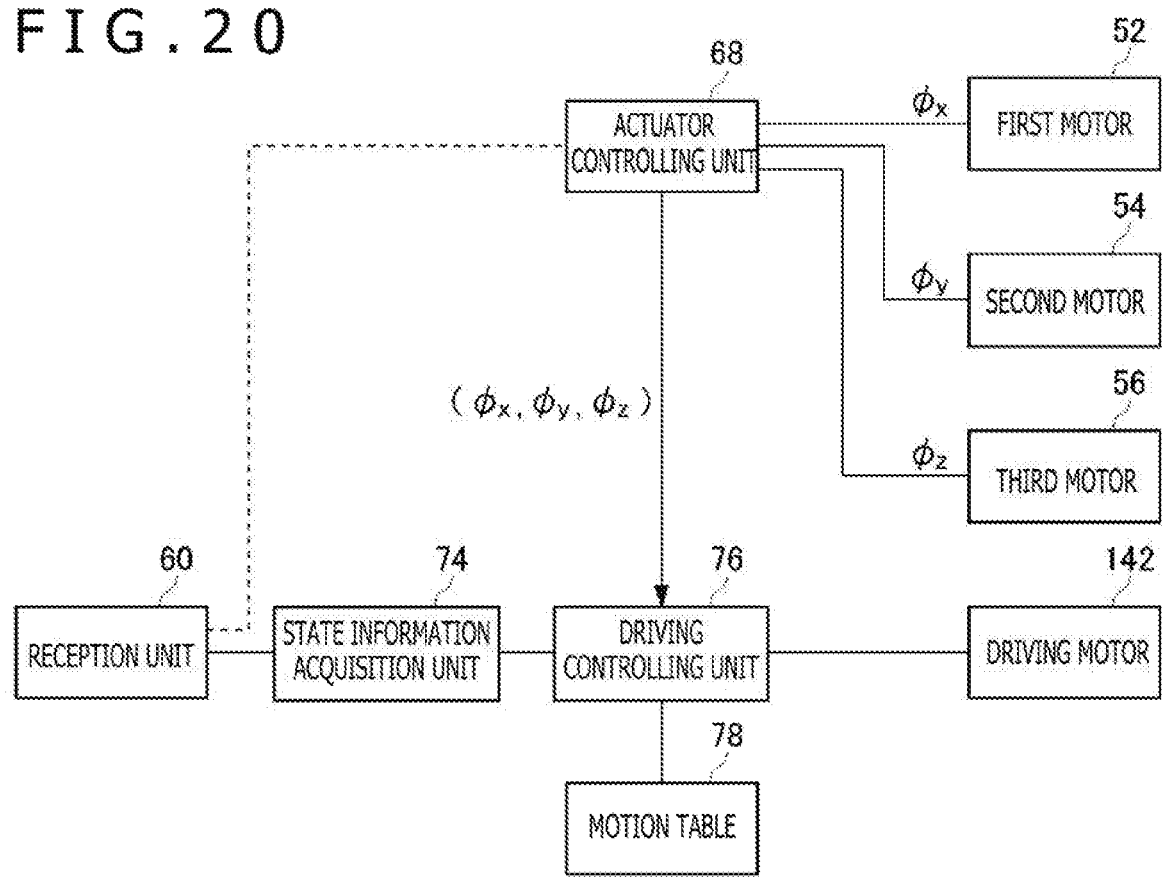
FIG. 20 is a view depicting functional blocks of an input system.

FIG. 20 depicts functional blocks of the input system 22 in the robot 10. It is to be noted that the functional blocks depicted in FIG. 20 are added to the input system 22 depicted in FIG. 10, and in FIG. 20, only components for driving and controlling the protective cover 19 are depicted. The input system 22 includes the reception unit 60, the actuator controlling unit 68, a state information acquisition unit 74, a driving controlling unit 76, and a motion table 78.

The elements indicated as functional blocks that perform various processes in FIG. 20 can be configured, in hardware, from a circuit block, a memory, and some other LSIs and are implemented, in software, by a program loaded in the memory and so forth. Accordingly, it is recognized by those skilled in the art that the functional blocks can be implemented in various forms only from hardware, only from software, or from a combination of hardware and software, and they are not restricted to any of them.

In the following, an example of a controlling technique for the protective cover 19 is described. First, as a premise, if the power supply to the robot 10 is turned on, then the actuator controlling unit 68 drives the first motor 52 and the second motor 54 such that the first arc-shaped arm 32 and the second arc-shaped arm 34 are placed into a state in which they are erected uprightly by 90 degrees with respect to the pedestal 30. Determining the posture of the housing 20 at this time as a reference posture, the rotational angle φx of the first motor 52, the rotational angle φy of the second motor 54, and the rotational angle φz of the third motor 56 are set to reference values (for example, 0). In short, in the reference posture, (φx, φy, φz) are set to (0, 0, 0).

Figure 21:
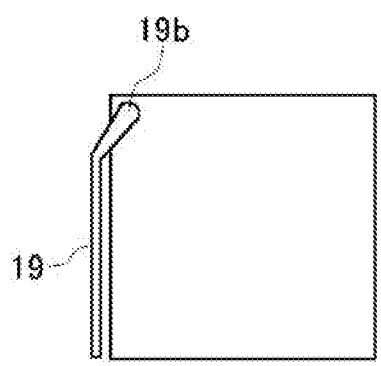
FIG. 21 depicts views illustrating a position of a protective cover.
Figure 21:
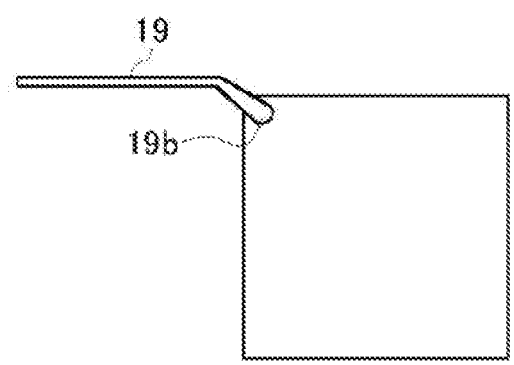
Figure 21:
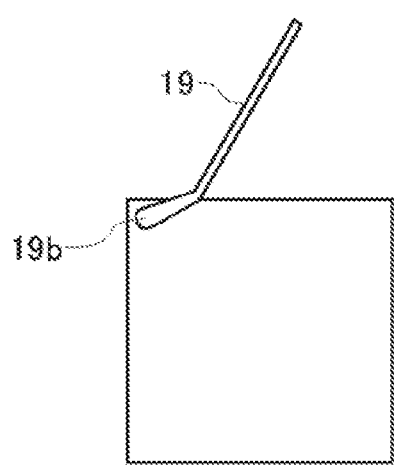

FIG. 21(a) to FIG. 21(c) depict positional relationship between a housing side plate and the protective cover 19. While the power supply to the robot 10 is turned off, the protective cover 19 is disposed at the closing position at which it protects the cameras 14. FIG. 21(a) depicts a state in which the protective cover 19 covers the front face of the housing 20 thereby to cover the cameras 14.

If the power supply to the robot 10 is turned on, then the driving controlling unit 76 controls rotation of the driving motor 142 to move the protective cover 19 to its operation initial position. The operation initial position is a position when the protective cover 19 is rotated upwardly by 90 degrees from the closing position. FIG. 21(b) depicts a state in which the protective cover 19 is moved to the operation initial position. Where the protective cover 19 moves to the operation initial position, the cameras 14 can thereafter pick up an image in the front direction. It is to be noted that the operation initial position may be set to a position that is not included in the angle of view of the cameras 14.

After the power supply to the robot 10 is turned on, the protective cover 19 can move within a range of the operation initial position to an operation maximum position. However, the protective cover 19 may be movable within a range of the closing position to the operation maximum position.

FIG. 21(c) depicts a state in which the protective cover 19 is moved to the operation maximum position. Although the operation maximum position may be set to a rotation limit position of the protective cover 19 at which the protective cover 19 and the housing top plate contact with each other, it may otherwise be set to a position on this side of the rotation limit position.

In the following, a technique for controlling rotation of the driving motor 142 on the basis of the posture of the housing 20 determined by the actuator apparatus 12 is described.

The actuator controlling unit 68 controls the rotational angle of the first motor 52, the second motor 54, and the third motor 56 in accordance with sensor information from the HMD 100. The actuator controlling unit 68 provides rotational angle information (φx, φy, φz) indicative of a posture of the housing 20 to the driving controlling unit 76, and the driving controlling unit 76 controls rotation of the driving motor 142 using the rotational angle information (φx, φy, φz).

In particular, the driving controlling unit 76 determines the rotational angle φ of the driving motor 142 in accordance with a formula given below. It is to be noted that the rotational angle φ at the operation initial position is 0.

$$\varphi = a \times |\varphi x| + b \times |\varphi y| + c \times |\varphi z|$$

Here, |φx|, |φy|, and |φz| represent absolute values of the rotational angles. a, b, and c are weighting coefficients for the rotational angles, and by suitably setting the weighting coefficients, an operational characteristic of the protective cover 19 can be determined according to tastes.

Since the driving controlling unit 76 arithmetically operates the rotational angle φ on the basis of the rotational angle information (φx, φy, φz) and supplies power to the driving motor 142 such that the rotational angle of the driving motor 142 becomes φ, a behavior of the protective cover 19 interlocking with the posture of the housing 20 can be implemented.

A different example of the rotation controlling technique based on the posture of the housing 20 is described. While, in the example described above, the behavior of the protective cover 19 interlocks with the posture of the housing 20, such control may be performed that, for example, in the case where the posture of the housing 20 does not vary for a predetermined period of time, the protective cover 19 is erected uprightly. When the posture of the housing 20 does not vary, a situation is assumed in which the user A is concentrated on some target and is staring at the target. At this time, the driving controlling unit 76 controls the driving motor 142 such that the protective cover 19 is erected uprightly. It is to be noted that a person around the robot 10 preferably knows in advance that upright erection of the protective cover 19 represents that the user A is concentrated. By inferring a situation in which the user A is concentrated from the posture of the housing 20 in this manner, the situation of the user A can be represented by a motion of the protective cover 19.

Now, a technique for controlling rotation of the driving motor 142 on the basis of facial expression information and/or emotion information of a user detected by the HMD 100 is described.

In the present example, the HMD 100 includes a sensor for detecting a motion of a specific region of the face of the user A. The HMD 100 includes a camera in the inside or on the outside of the housing 114 and includes a facial expression monitoring unit that monitors the facial expression of the face of a user, more particularly, a motion of an eye, an eyebrow, the nose, a lip or the like. In the past, although various investigations have been performed in regard to the relationship between an emotion and a facial expression, the following (1) to (5) indicate relationships between an emotion and a facial expression published in previous studies.
(1) Happiness: the upper end of the lip rises and is drawn to the back.
(2) Surprise: the eyebrows rise and the eyes are wide open.
(3) Aversion: the upper lip rises and wrinkles are made on the nose.
(4) Anger: vertical wrinkles are made between the eyebrows, and the mouth is closed tightly.
(5) Sorrow: the opposite ends of the lip drop and also the line of sight rather drops.

A database is made for the relationship between the emotion and the facial expression in the HMD 100, and the facial expression monitoring unit is configured such that it can refer, if a facial expression of the user A is specified from a camera image, to the database to read out emotion information corresponding to the facial expression. Since the emotion of a person changes every moment, every time the facial expression monitoring unit decides that a change in emotion occurs from a change of a specific location included in the camera image, it transmits emotion information extracted from the database to the robot 10.

For example, if the facial expression monitoring unit decides from the camera image that "the upper end of the lip rises and is drawn to the back," then it reads out emotion information ("happiness") associated with the facial expression information and transmits the emotion information to the robot 10. Thereafter, if the facial expression monitoring unit decides from the camera image that "the eyebrows rise and the eyes are wide open," then it reads out emotion information ("surprise") associated with the facial expression information and transmits the emotion information to the robot 10. It is to be noted that, in the case where the facial expression information detected by the facial expression monitoring unit is not registered in the database, the facial expression monitoring unit transmits emotion information indicating that the user has no emotion to the robot 10. It is to be noted that the emotion information to be transmitted may be information from which an emotion can be specified and may be, for example, an information identification (ID) of emotion information such as (1) or (2).

The facial expression monitoring unit may transmit, in place of emotion information, facial expression information itself, for example, facial expression information indicating that "the upper end of the lip rises and is drawn to the back" or facial expression information indicated that "the eyebrows rise and the eyes are wide open" to the robot 10. Further, the facial expression monitoring unit may transmit both emotion information and facial expression information to the robot 10. In the following description, such facial expression and/or emotion information are collectively referred to as state information.

Referring to FIG. 20, the reception unit 60 receives the state information, and the state information acquisition unit 74 acquires the state information. The driving controlling unit 76 controls rotation of the driving motor 142 on the basis of the state information. At this time, the driving controlling unit 76 refers to the motion table 78.

The motion table 78 retains facial expression information and/or emotion information and motion modes of the protective cover 19 in an associated relationship with each other.

FIG. 22 depicts an example of the retained substance of the motion table. In the motion table 78 depicted in FIG. 22, emotion information and motion modes of the protective cover 19 are recorded in an associated relationship with each other. The driving controlling unit 76 drives the driving motor 142 on the basis of the emotion information acquired from the HMD 100 such that the protective cover 19 moves in a corresponding motion mode. For example, in the case where the emotion information is "happiness," the driving controlling unit 76 controls rotation of the driving motor 142 such that the protective cover 19 moves back and forth by 30 degrees forwardly and rearwardly (with an amplitude of 60 degrees) from the state in which the protective cover 19 is erected uprightly by 90 degrees from the operation initial position. Consequently, a person around the robot 10 can recognize by viewing the motion of the protective cover 19 that the user A feels happy. For example, in the case where the facial expression monitoring unit in the HMD 100 can decide a degree that represents whether the emotion is great or small, the driving controlling unit 76 may set the speed of the back and forth movement in response to the degree.

While, in FIG. 22, the motion table 78 retains emotion information and motion modes of the protective cover 19 in an associated relationship with each other, it may otherwise retain facial expression information and motion modes of the protective cover 19 in an associated relationship with each other.

It is to be noted that, in the example described above, the state information acquisition unit 74 acquires facial expression information and/or emotion information of a user detected by the HMD 100 the user wears. Although facial expression information and/or emotion information of a user who wears the HMD 100 may be detected by the HMD 100 in this manner, it may otherwise be detected by an information processing apparatus provided outside the HMD 100. In other words, although the facial expression monitoring unit may be provided on the HMD 100, it may otherwise be provided in an information processing apparatus different from the HMD 100. At this time, the information processing apparatus specifies a facial expression or an emotion of the user on the basis of a camera image picked up by a camera that picks up an image of the user and transmits the specified facial expression or emotion to the robot 10. In either case, the state information acquisition unit 74 acquires facial expression information and/or emotion information of the user who wears the HMD 100, and the driving controlling unit 76 controls rotation of the driving motor 142 on the basis of the facial expression information and/or emotion information of the user.

REFERENCE SIGNS LIST

1 . . . Information processing system, 10 . . . Robot, 12 . . . Actuator apparatus, 14a . . . Right camera, 14b . . . Left camera, 16a . . . Right microphone, 16b . . . Left microphone, 20 . . . Housing, 22 . . . Input system, 24 . . . Output system, 30 . . . Pedestal, 32 . . . First arc-shaped arm, 32a . . . First elongated through-hole, 34 . . . Second arc-shaped arm, 34a . . . Second elongated through-hole, 36 . . . Housing, 38 . . . Cover, 40 . . . Leg unit, 42 . . . Insertion member, 42a . . . First restriction portion, 42b . . . Second restriction portion, 42c . . . Stem portion, 50 . . . Driving mechanism, 52 . . . First motor, 54 . . . Second motor, 56 . . . Third motor, 60 . . . Reception unit, 62 . . . Sensor information acquisition unit, 64 . . . Motion detection unit, 66 . . . Gaze direction determination unit, 68 . . . Actuator controlling unit, 70 . . . Sound data acquisition unit, 72 . . . Sound processing unit, 74 . . . State information acquisition unit, 76 . . . Driving controlling unit, 78 . . . Motion table, 80 . . . Image processing unit, 82 . . . Sound processing unit, 82a . . . Phase difference amplification apparatus, 84a . . . First amplifier, 84b . . . Second amplifier, 86a . . . First adder, 86b . . . Second adder, 88a . . . Third amplifier, 88b . . . Fourth amplifier, 90 . . . Transmission unit, 92 . . . Image recording apparatus, 100 . . . HMD, 102 . . . Display panel, 104 . . . Earphone, 106 . . . Microphone, 108 . . . Mounting band, 110 . . . Output mechanism unit, 112 . . . Mounting mechanism unit, 114 . . . Housing, 120 . . . Control unit, 122 . . . Storage unit, 124 . . . Posture sensor, 126 . . . Communication controlling unit, 142 . . . Driving motor, 144 . . . Transmission member, 200 . . . Processing apparatus, 202 . . . Reception unit, 204 . . . Sensor information acquisition unit, 206 . . . Motion detection unit, 208 . . . Gaze direction determination unit, 210 . . . Image determination unit, 212 . . . Sound determination unit, 214 . . . Viewing data provision unit, 216 . . . Transmission unit, 218 . . . Recording unit, 220 . . . Image recording unit, 222 . . . Sound recording unit.

INDUSTRIAL APPLICABILITY

The present invention can be utilized in the field of a robot and so forth.

The invention claimed is:

1. A robot that includes an actuator apparatus and a housing whose posture can be changed by the actuator apparatus and in which the housing at least includes a camera, a microphone, and a speaker and the actuator apparatus causes a posture of the housing to interlock with a motion of a head-mounted display apparatus a user wears, the robot comprising:
a movable member supported for motion on the housing, wherein the movable member is a rotatable flap configured to cover at least a portion of the housing;
a motor provided in the housing;
a transmission member configured to transmit rotation of the motor to the rotatable flap in response to an expression of the user detected by the head-mounted display; and
a driving controlling unit configured to control rotation of the motor.

2. The robot according to claim 1, wherein the housing configures a face of the robot.

3. The robot according to claim 1, wherein the driving controlling unit controls rotation of the motor on the basis of a posture of the housing.

4. The robot according to claim 1, wherein the transmission member is a member that deforms torsionally and elastically.

5. The robot according to claim 1, wherein the expression of the user is defined by movement of the user's eyebrows.

6. The robot according to claim 1, wherein the at least a portion of the housing covered by the rotatable flap includes the camera.

7. A housing that includes a camera, a microphone, and a speaker, the housing comprising:
a movable member supported for motion on the housing, wherein the movable member is a rotatable flap configured to cover at least a portion of the housing;
a motor;
a transmission member configured to transmit rotation of the motor to the rotatable flap in response to an expression of the user detected by the head-mounted display; and
a driving controlling unit configured to control rotation of the motor.

8. The housing according to claim 7, wherein the transmission member is a member that deforms torsionally and elastically.

9. The housing according to claim 8, wherein the transmission member is a coil spring.

10. The housing according to claim 7, wherein the movable member is moved between a closing position at which the movable member protects the camera and a position different from the closing position.

11. The housing according to claim 7, wherein the movable member is supported for pivotal motion on the housing.

* * * * *